(12) United States Patent
Mou et al.

(10) Patent No.: US 11,530,969 B2
(45) Date of Patent: Dec. 20, 2022

(54) PARTICLE DETECTING DEVICE

(71) Applicant: Microjet Technology Co., Ltd., Hsinchu (TW)

(72) Inventors: Hao-Jan Mou, Hsinchu (TW); Ching-Sung Lin, Hsinchu (TW); Chin-Chuan Wu, Hsinchu (TW); Chi-Feng Huang, Hsinchu (TW); Yung-Lung Han, Hsinchu (TW); Chang-Yen Tsai, Hsinchu (TW); Wei-Ming Lee, Hsinchu (TW)

(73) Assignee: Microjet Technology Co., Ltd., Hsinchu (TW)

( * ) Notice: Subject to any disclaimer, the term of this patent is extended or adjusted under 35 U.S.C. 154(b) by 0 days.

(21) Appl. No.: 17/366,845

(22) Filed: Jul. 2, 2021

(65) Prior Publication Data
US 2022/0018752 A1 Jan. 20, 2022

(30) Foreign Application Priority Data
Jul. 20, 2020 (TW) .................................. 109124417

(51) Int. Cl.
*G01N 15/06* (2006.01)
*G01N 1/24* (2006.01)

(52) U.S. Cl.
CPC ........... *G01N 15/0656* (2013.01); *G01N 1/24* (2013.01)

(58) Field of Classification Search
CPC .... G01N 15/0656; G01N 1/25; G01N 1/2208; G01N 1/2273; G01N 15/0606
See application file for complete search history.

(56) References Cited

U.S. PATENT DOCUMENTS

| | | | | |
|---|---|---|---|---|
| 2014/0083167 A1* | 3/2014 | Liu | ........................ | G01N 15/06 73/28.02 |
| 2021/0405007 A1* | 12/2021 | Solomon | .................. | G01G 3/13 |

FOREIGN PATENT DOCUMENTS

| | | | | |
|---|---|---|---|---|
| JP | 2015224962 A | * | 12/2015 | ............. G01N 15/06 |
| TW | 201432632 A | | 8/2014 | |
| TW | 2021432632 A | | 8/2014 | |
| TW | 202004159 A | | 1/2020 | |

OTHER PUBLICATIONS

English Machine Translation of Takahime, JP 2015-224962, Dec. 2015 (Year: 2022).*

* cited by examiner

*Primary Examiner* — David Z Huang
(74) *Attorney, Agent, or Firm* — Birch, Stewart, Kolasch & Birch, LLP

(57) ABSTRACT

A particle detecting device is provided. The particle detecting device includes an impactor, a resonator and a piezoelectric actuator. A gas containing a plurality of suspended particles is transported into the impactor and is impacted by the impactor for performing separation and screening based on different diameters of the suspended-particles. Moreover, screened and required-diameter particles from the impactor are collected by the resonator to detect a mass and a concentration of the screened and required-diameter particles. Thus, the air quality can be monitored anytime and anywhere.

8 Claims, 22 Drawing Sheets

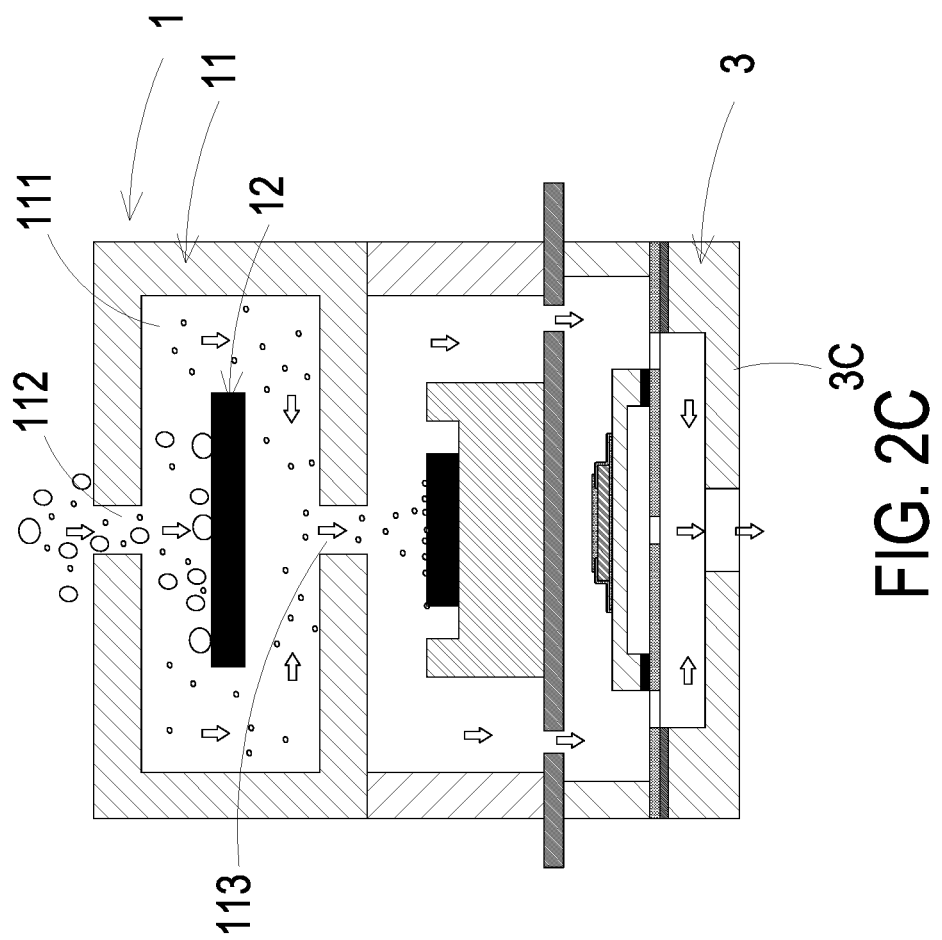

US 11,530,969 B2

PARTICLE DETECTING DEVICE

FIELD OF THE INVENTION

The present disclosure relates to a particle detecting device, and more particularly to a particle detecting device easy to carry and capable of monitoring air quality immediately anytime and anywhere.

BACKGROUND OF THE INVENTION

Nowadays, people pay more and more attention to the air quality in the environment. Various of gases and substances, such as carbon monoxide, carbon dioxide, volatile organic compounds (VOC), Particulate Matter 2.5 (PM2.5), nitric oxide, sulfur monoxide, and so on, exposure in the ambient environment will cause human health problems or even is harmful to the life. Therefore, people pay more and more attention to the air quality in the environment in every country, and how to monitor and keep away from the harmful air quality become a currently concerned issue.

Generally, it is feasible to use a particle detecting device to monitor the air quality in the environment. If the particle detecting device is capable of providing people with the monitored information relating to the environment immediately for warning, it may help people to escape or prevent from the injuries and influence on human health caused by the exposure to the gases and substances described above in the ambient environment. In other words, the particle detecting device suitable for monitoring the air in the ambient environment may be a portable miniature device easy to carry, and can monitor the air quality immediately everywhere and anytime, which are main subjects of research and development in the present disclosure.

SUMMARY OF THE INVENTION

An object of the present disclosure is to provide a particle detecting device. A portable miniature particle detecting device is formed by an impactor, a resonator and a piezoelectric actuator. The piezoelectric actuator is used to transport a gas into the impactor, the gas outside the particle detecting device is inhaled into and impacted by the impactor for collecting the screened and required-diameter particles and detecting a mass and a concentration of the screened and required-diameter particles through the resonator. Thus, the air quality can be monitored immediately anytime and anywhere, and people are allowed to understand the gas quality of the inhaled gas.

In accordance with an aspect of the present disclosure, a particle detecting device is provided. The particle detecting device includes an impactor, a resonator and a piezoelectric actuator. The impactor includes a box and an impacting plate. The box includes a screening chamber, an air inlet and a discharging through hole. The screening chamber is disposed within the box and in fluid communication with the air inlet and the discharging through hole. The impacting plate disposed within the screening chamber is corresponding to the air inlet and maintains an spacing distance to be impacted by suspended particles contain in the gas inhaled through the air inlet for performing separation and screening based on the different diameters of the suspended particles, so that the particles with screened and required-diameter can be led out and collected through the discharging through hole. The resonator is disposed under, sealed and connected to the impactor, and includes a sampling chamber, a driving board, a piezoelectric vibrator and a suspended-particle sensor. The sampling chamber is in fluid communication with the discharging through hole of the impactor, the driving board is disposed within the sampling chamber and includes at least one passage hole disposed thereon, and the piezoelectric vibrator is packaged on the driving board. The suspended-particle sensor is packaged on the piezoelectric vibrator, and the suspended-particle sensor corresponds to the discharging through hole and maintains a spacing distance. Driving power and operation frequency are provided to the piezoelectric vibrator by the driving board, a resonance frequency of the piezoelectric vibrator is changed, and the screened and required-diameter particles are sedimented and collected on a surface of the suspended-particle sensor, so that a mass and a concentration of the screened and required-diameter particles can be detected. The piezoelectric actuator is disposed under, sealed and connected to the resonator, and is driven to enable gas transportation, so that the gas is inhaled through the air inlet from an outside of the particle detecting device, flowed into the resonator to be collected by the suspended-particle sensor, and discharged out of the particle detecting device through the at least one passage hole.

BRIEF DESCRIPTION OF THE DRAWINGS

The above contents of the present disclosure will become more readily apparent to those ordinarily skilled in the art after reviewing the following detailed description and accompanying drawings, in which:

FIG. 2C is a cross sectional view illustrating a blower-type microelectromechanical-system micro pump of the particle detecting device of the present disclosure for a gas transporting operation;

DETAILED DESCRIPTION OF THE PREFERRED EMBODIMENT

Figure 1:
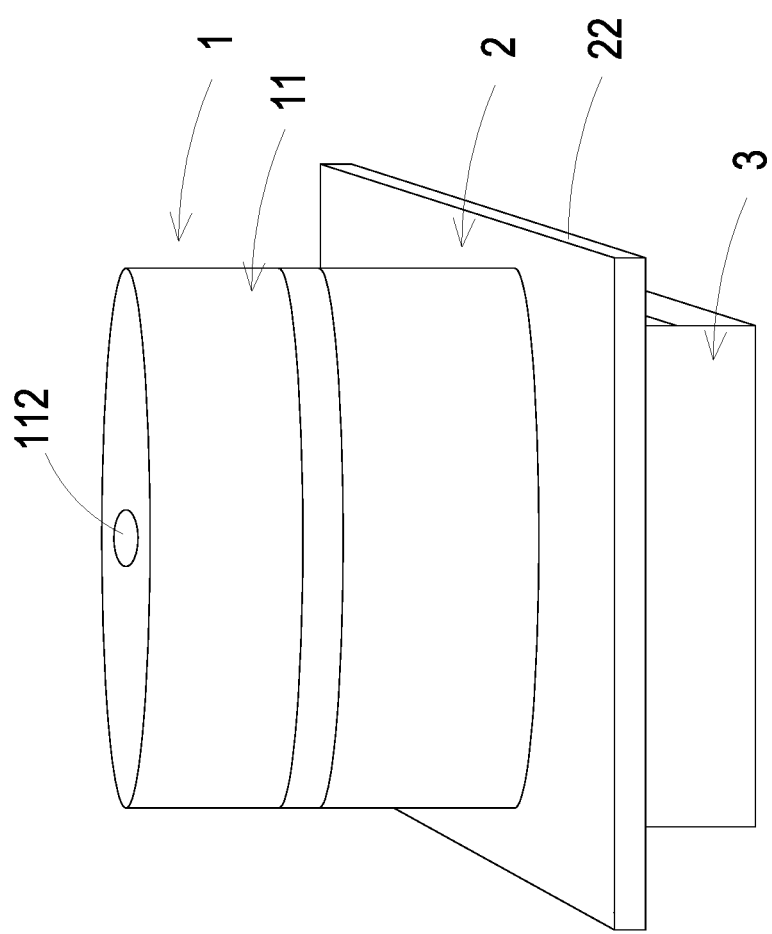
FIG. 1 is a schematic exterior view illustrating a particle detecting device according to an embodiment of the present disclosure.

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

As shown in FIG. 1 and FIGS. 2A to 2D, the present disclosure provides a particle detecting device including an impactor 1, a resonator 2 and a piezoelectric actuator 3. In the embodiment, the impactor 1 includes a box 11 and an impacting plate 12. The box 11 includes a screening chamber 111, an air inlet 112 and a discharging through hole 113. The screening chamber 111 is disposed within the box 11 and in fluid communication with the air inlet 112 and the discharging through hole 113. The impacting plate 12 disposed within the screening chamber 111 is corresponding to the air inlet 112 and maintains a spacing distance to be impacted by suspended particles containing in the gas inhaled through the air inlet 112 for performing separation and screening based on different diameters of the suspended particles, so that the particles with screened and required-diameter can be led out and collected through the discharging through hole 113. Moreover, the resonator 2 is disposed under, sealed and connected to the impactor 1, and includes a sampling chamber 21, a driving board 22, a piezoelectric vibrator 23 and a suspended-particle sensor 24. In the embodiment, the sampling chamber 21 is in fluid communication with the discharging through hole 113 of the impactor 1. The driving board 22 is disposed within the sampling chamber 21 and includes at least one passage hole 221 disposed thereon, and the piezoelectric vibrator 23 is packaged on the driving board 22. The suspended-particle sensor 24 is packaged on the piezoelectric vibrator 23, and the suspended-particle sensor 24 is corresponding to the discharging through hole 113 and maintains a spacing distance. In that, the driving board 22 provides driving power and operation frequency to the piezoelectric vibrator 23 and changes the resonance frequency of the piezoelectric vibrator 23, and the screened and required-diameter particles are sedimented and collected on a surface of the suspended-particle sensor 24. Thus, the suspended-particle sensor 24 can detect a mass and a concentration of the screened and required-diameter particles through the correlation between the changes of inherent frequency and the changes of particle mass. That is, the changes of resonance frequency of the piezoelectric vibrator 23 are proportional to the changes of particle mass. Therefore, the mass and the concentration of the screened and required-diameter particles can be detected by collecting the screened and required-diameter particles sedimented on the surface of the suspended-particle sensor 24. Certainly, the gas transportation in the inner chambers, such as the screening chamber 111 of the impactor 1 and the sampling chamber 21 of the resonator 2, is achieved by the piezoelectric actuator 3. In the embodiment, the piezoelectric actuator 3 is disposed under, sealed and connected to the resonator 2. When the piezoelectric actuator 3 is driven to enable the gas transportation, the gas is inhaled from an outside of the particle detecting device through the air inlet 112 into the screening chamber 111. Then, the screened and required-diameter particles screened by the impactor 1 are led out through the discharging through hole 113, and enters the sampling chamber 21 of the resonator 2. Thereafter, the particles contained in the gas are sedimented and collected by the suspended-particle sensor 24. Moreover, the inhaled gas is further discharged out of the particle detecting device through the at least one passage hole 221 of the driving board 22. In the embodiment, the piezoelectric vibrator 23 is a quartz chip, but not limited thereto. Preferably but not exclusively, the suspended-particle sensor 24 can detect the mass and the concentration of the screened and required-diameter particles contained in the gas which are selected form the group consisting of suspended particles PM10, suspended particles PM2.5, suspended particles PM1 and a combination thereof.

Figure 2A:
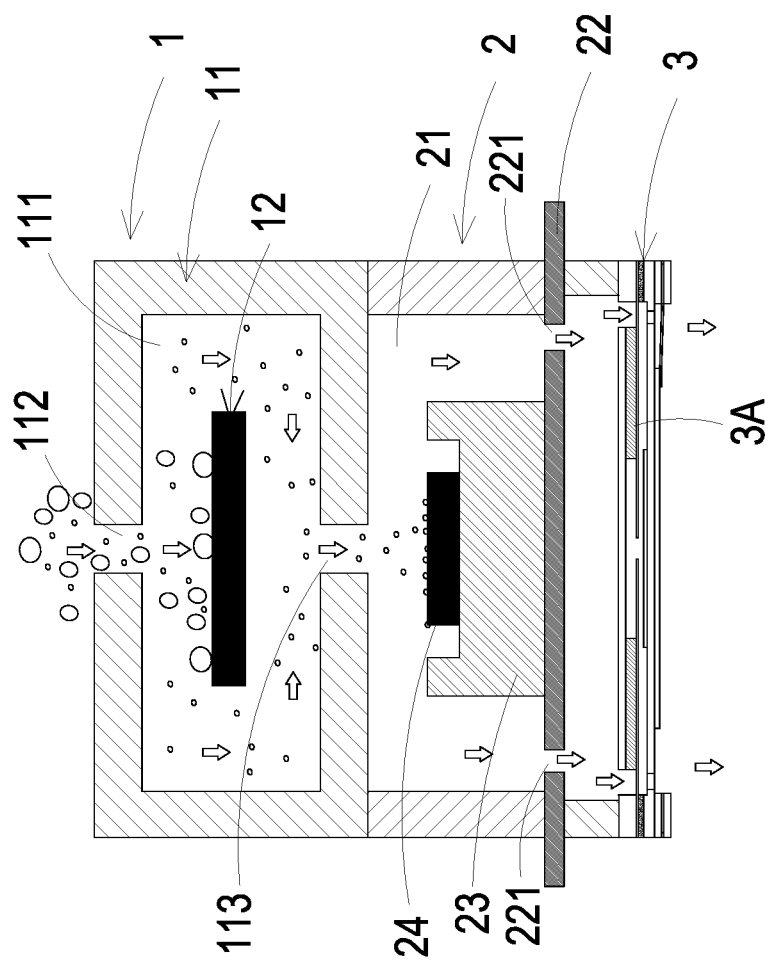
FIG. 2A is a cross sectional view illustrating a micro pump of the particle detecting device of the present disclosure for a gas transporting operation.
Figure 2B:
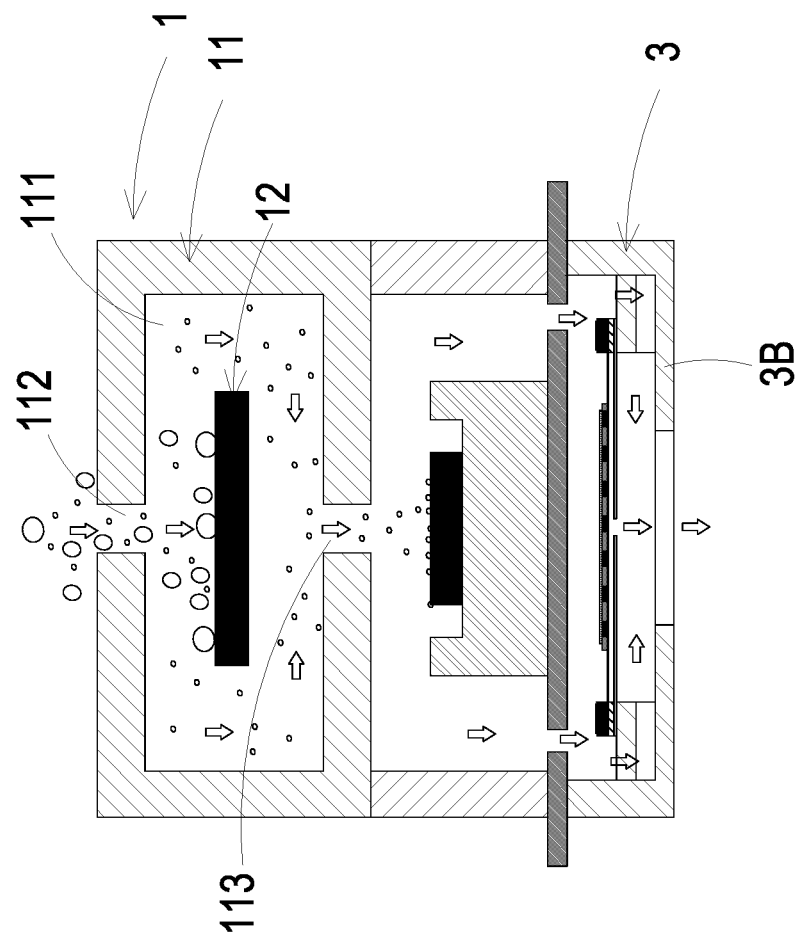
FIG. 2B is a cross sectional view illustrating a blower-type micro pump of the particle detecting device of the present disclosure for a gas transporting operation.
Figure 2D:
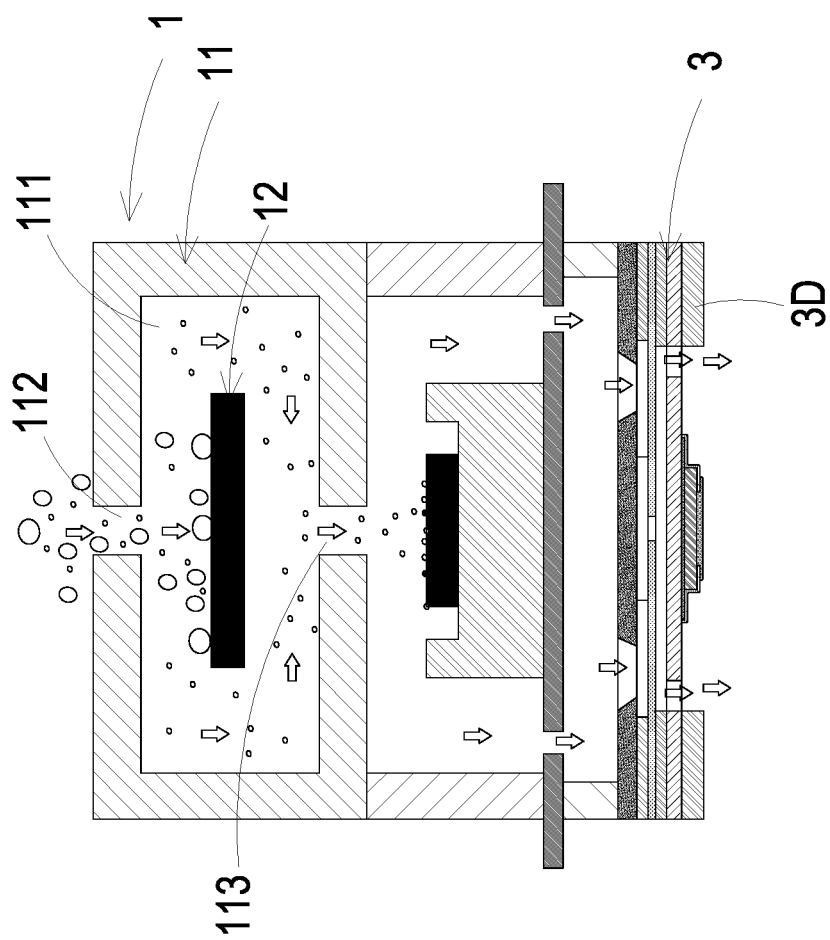
FIG. 2D is a cross sectional view illustrating a microelectromechanical-system pump of the particle detecting device of the present disclosure for a gas transporting operation.

In the embodiment, the piezoelectric vibrator 3 can be various types of micro gas transportation structure, for example a micro pump 3A shown in FIG. 2A, a blower-type micro pump 3B shown in FIG. 2B, a blower-type microelectromechanical-system micro pump 3C shown in FIG. 2C, or a microelectromechanical-system pump 3D shown in FIG. 2D. As for the related structures and the gas transportation operation steps of the above mentioned micro pump 3A, the blower-type micro pump 3B, the blower-type microelectromechanical-system micro pump 3C and the microelectromechanical-system pump 3D are described below.

Figure 3A:
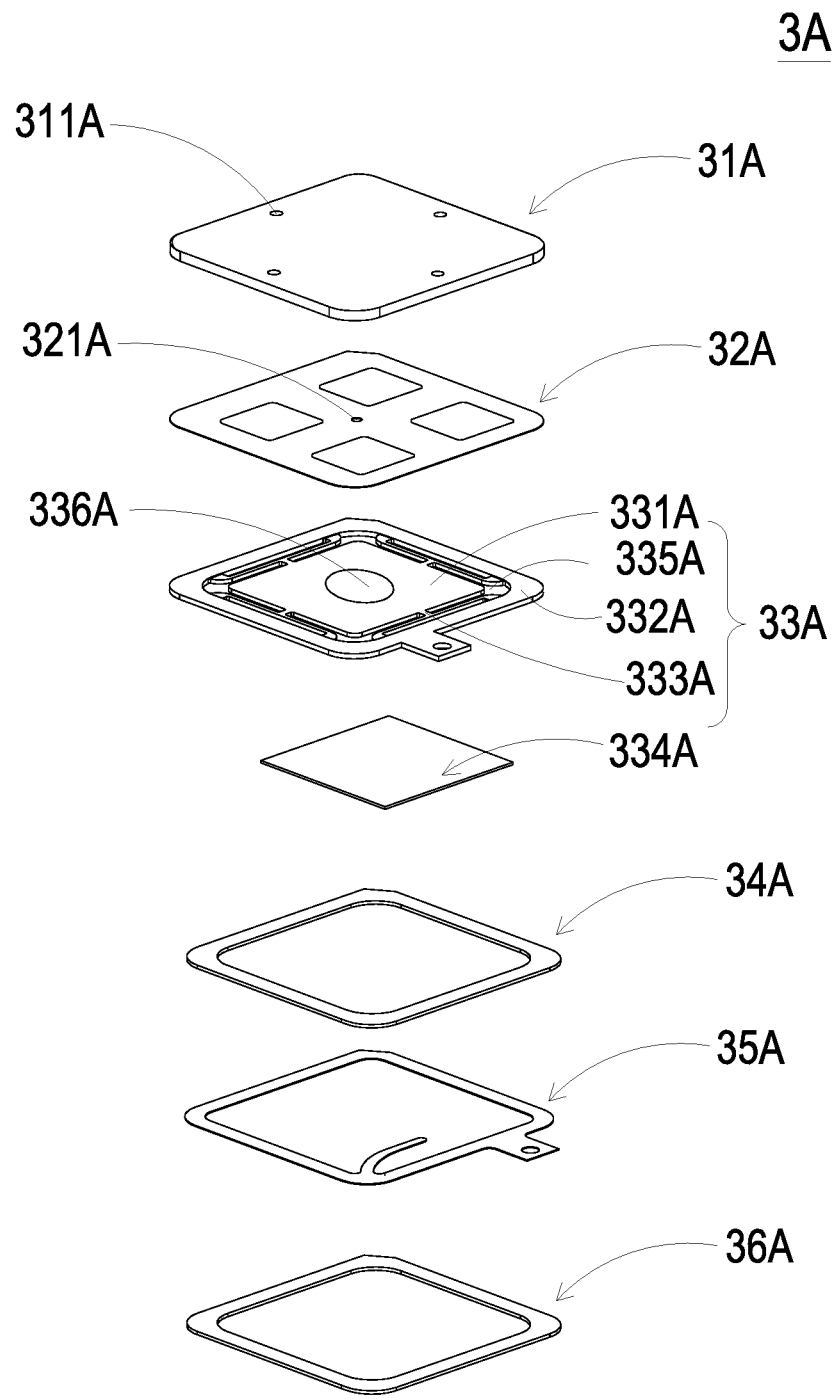
FIG. 3A is a schematic exploded view illustrating the micro pump of the particle detecting device of the present disclosure and taken along front viewpoint.
Figure 3B:
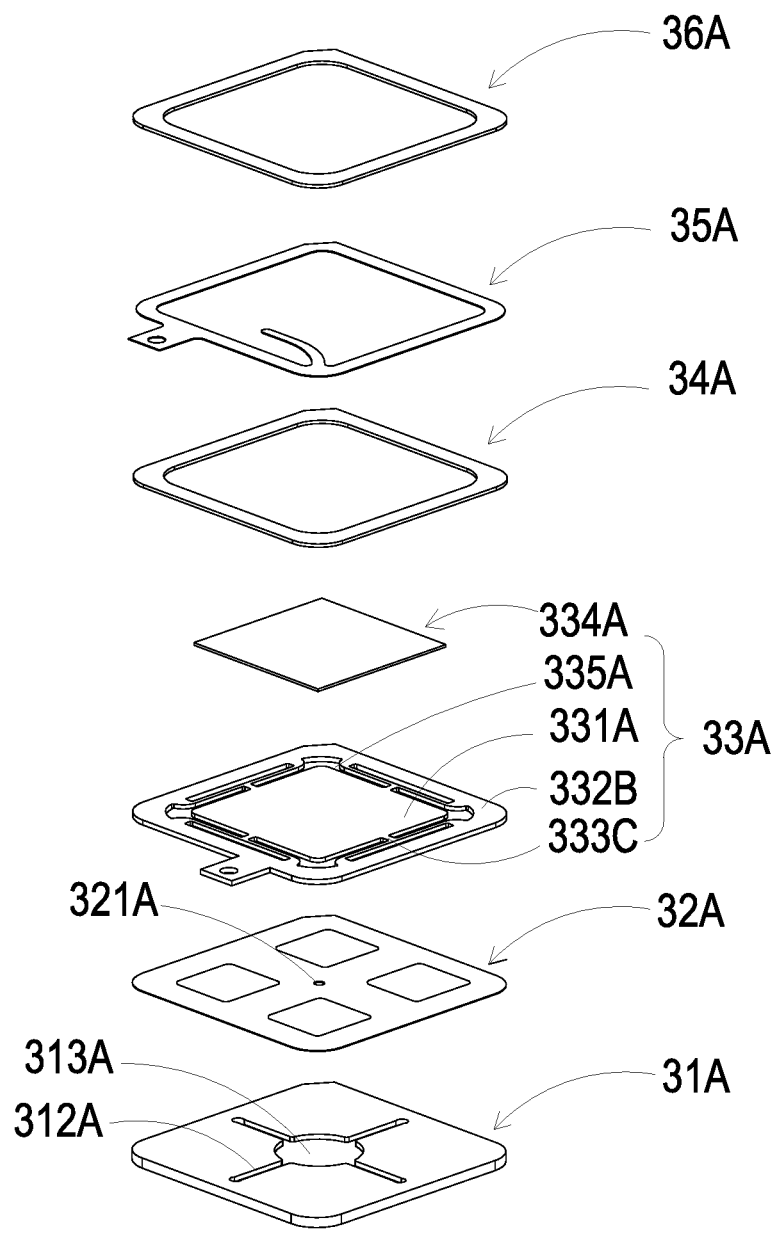
FIG. 3B is a schematic exploded view illustrating the micro pump of the particle detecting device of the present disclosure and taken along rear viewpoint.
Figure 4A:
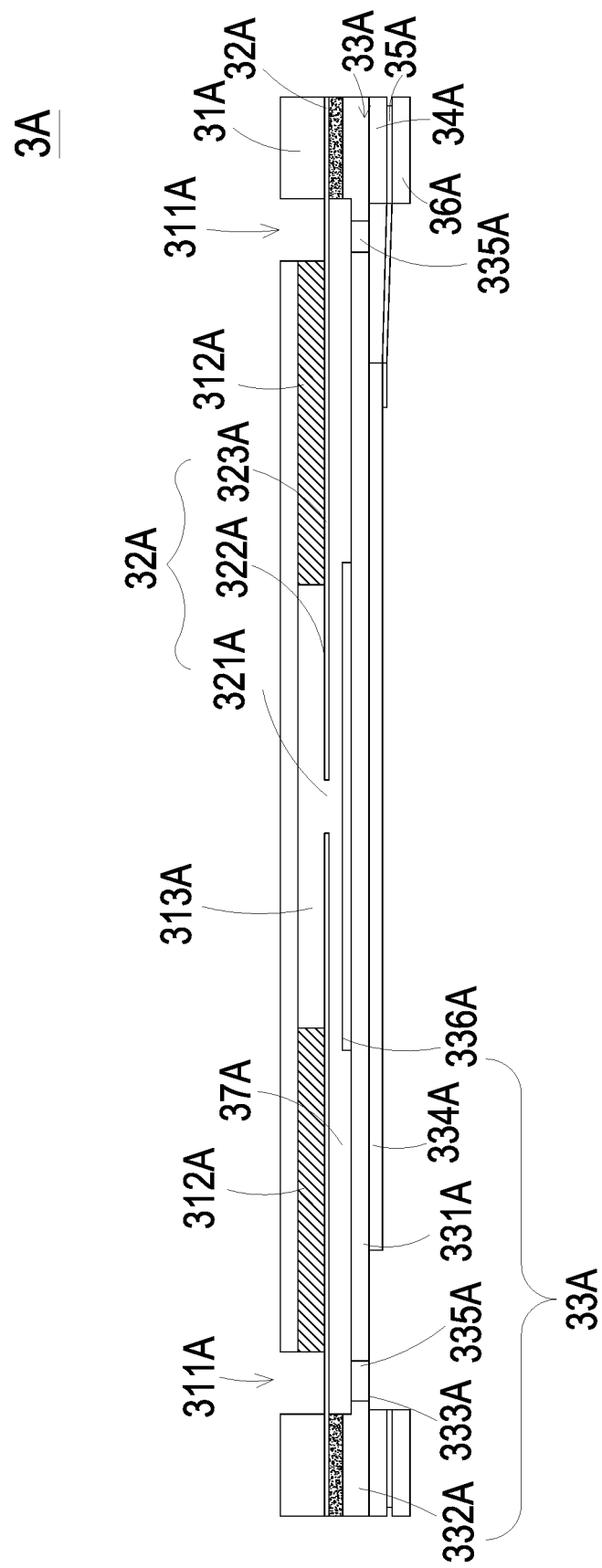
FIG. 4A is a schematic cross-sectional view illustrating the micro pump of particle detecting device of the present disclosure.

As shown in FIG. 3A, FIG. 3B and FIG. 4A, the micro pump 3A is formed by sequentially stacking an inlet plate 31A, a resonance plate 32A, a piezoelectric actuator 33A, a first insulation plate 34A, a conductive plate 35A and a second insulation plate 36A. In the embodiment, the inlet plate 31A includes at least one inlet aperture 311A, at least one convergence channel 312A and a convergence chamber 313A. The at least one inlet aperture 311A is disposed to inhale the gas. The inlet aperture 311A is disposed corresponding in position to the convergence channel 312A and in communication therewith. The convergence channel 312A converge to the convergence chamber 313A, so as to allow the gas inhaled from the inlet aperture 311A to converge to the convergence chamber 313A. In the embodiment, the number of the inlet apertures 311A and the number of the convergence channels 312A are the same. Preferably, the number of the inlet apertures 311A and the number of the convergence channels 312A are exemplified by four, but not limited thereto. The four inlet apertures 311A penetrate through the inlet plate 31A into the four convergence channels 312A respectively, and the four convergence channels 312A converge to the convergence chamber 313A. In the embodiment, the resonance plate 32A is attached to and assembled on the inlet plate 31A. The resonance plate 32A has a central aperture 321A, a movable part 322A and a fixed part 323A. The central aperture 321A is located at the center of the resonance plate 32A and is corresponding in position to the convergence chamber 313A of the inlet plate 31A. The movable part 322A is disposed at the region around the central aperture 321A and is corresponding to the convergence chamber 323A. The fixed part 323A is disposed at the region of the periphery of the resonance plate 32A and securely attached on the inlet plate 31A. In the embodiment, the piezoelectric actuator 33A is combined on the resonance plate 32A and is corresponding to the resonance plate 32A. The piezoelectric actuator 33A includes a suspension plate 331A, an outer frame 332A, at least one bracket 333A and a piezoelectric element 334A. The suspension plate 331A is square-shaped and permitted to undergo a bending deformation. The outer frame 332A is disposed around a periphery of the suspension plate 331A. The at least one bracket 333A is connected between the suspension plate 331A and the outer frame 332A for elastically supporting the suspension plate 331A. The piezoelectric element 334A is attached to a surface of the suspension plate 331A for driving the suspension plate 331A to undergo the bending deformation as a voltage is applied thereto. In the embodiment, at least one vacant space 335A is formed between the suspension plate 331A, the outer frame 332A and the at least one bracket 333A for allowing the gas to flow therethrough. In addition, a bulge 336A is formed on a surface of the suspension plate 331A opposite to the surface that the suspension plate 331A attached. In that, the inlet plate 31A, the resonance plate 32A, the piezoelectric actuator 33A, the first insulation plate 34A, the conductive plate 35A and the second insulation plate 36A are stacked sequentially. In the embodiment, a chamber space 37A is formed between the suspension plate 331A of the piezoelectric actuator 33A and the resonance plate 32A. Moreover, the chamber space 37A can be formed by filling a gap between the resonance plate 32A and the outer frame 332A of the piezoelectric actuator 33A with a material, such as a conductive adhesive, but not limited thereto. Thus, a specific depth between the resonance plate 32A and the suspension plate 331A is maintained to allow the gas to pass rapidly. In addition, since the suspension plate 331A and the resonance plate 32A are maintained at a suitable distance, so that the contact interference therebetween is reduced and the generated noise is largely reduced.

Figure 4B:
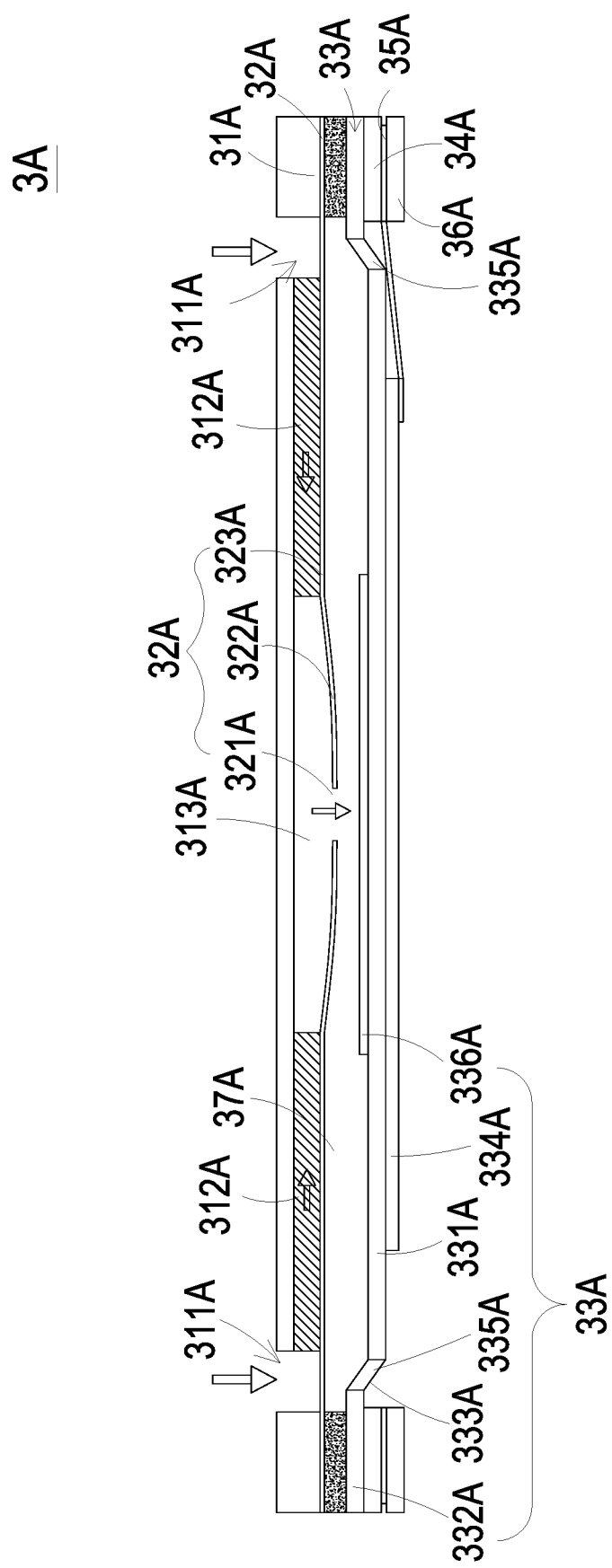
FIGS. 4B to 4D schematically illustrate the operation steps of the micro pump of FIG. 4A.
Figure 4C:
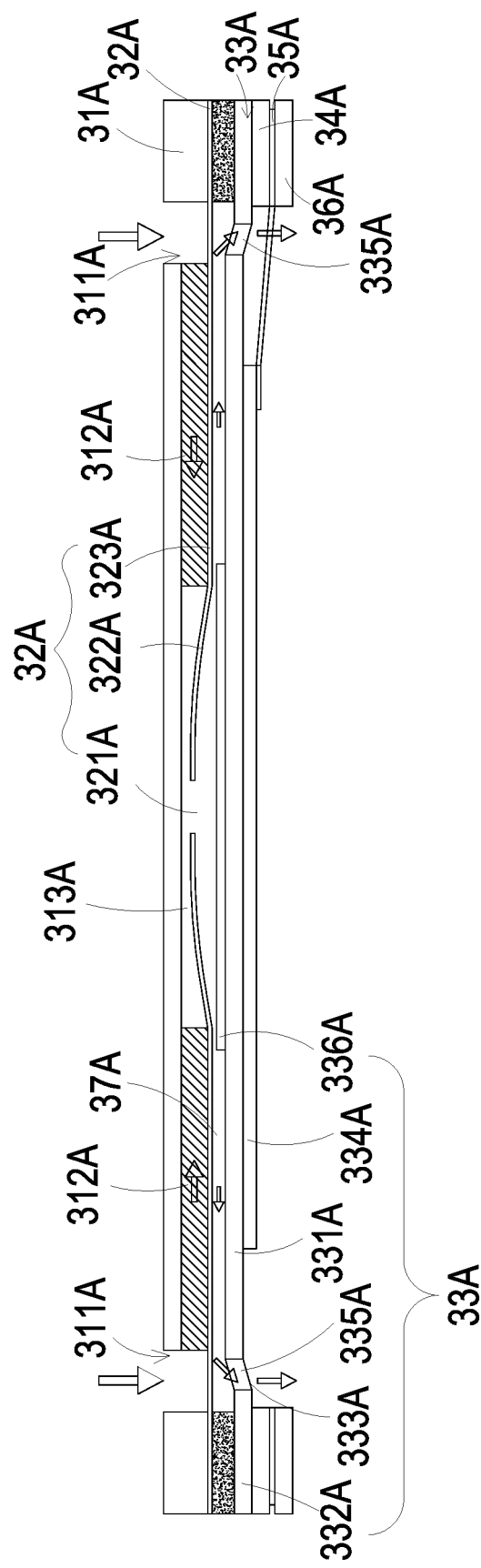
Figure 4D:
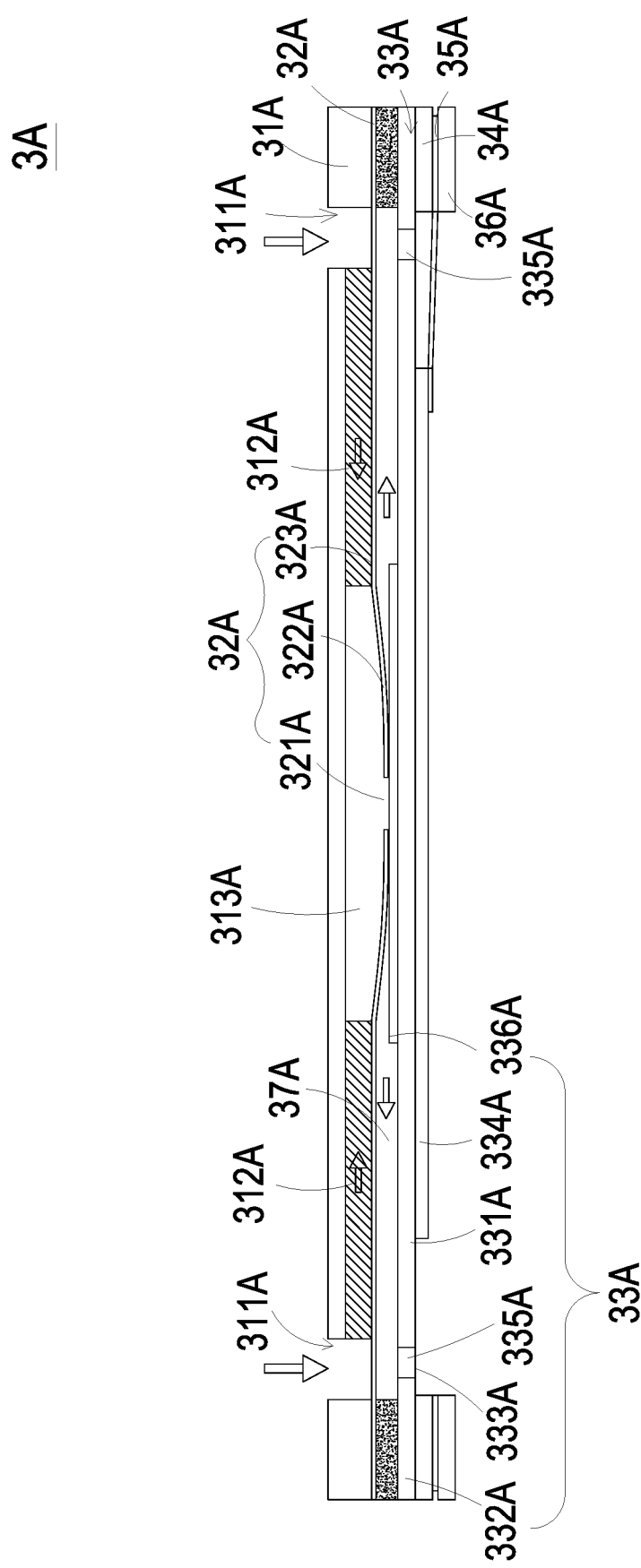

In order to understand the operation steps of the above-mentioned micro pump 3A for gas transportation, please refer to FIGS. 4B to 4D. Firstly, please refer to FIG. 4B. When the piezoelectric element 334A of the piezoelectric actuator 33A is deformed when a voltage is applied thereto, the suspension plate 331A is driven to displace downwardly. In that, the volume of the chamber space 37A is increased and a negative pressure is generated in the chamber space 37A, and the gas in the convergence chamber 313A is introduced into the chamber space 37A. At the same time, the resonance plate 32A is in resonance with the suspension plate 331A and displaced synchronously. Thereby, the volume of the convergence chamber 313A is increased and the gas in the convergence chamber 313A is introduced into the chamber space 37A, thus a negative pressure is also generated in the convergence chamber 313A, and the gas is inhaled into the convergence chamber 313A through the inlet apertures 311A and the convergence channels 312A. Then, as shown in FIG. 4C, the piezoelectric element 334A drives the suspension plate 331A to displace upwardly and compress the chamber space 37A. Similarly, the resonance plate 32A is in resonance with the suspension plate 331A and is displaced upwardly. Thus, the gas in the chamber space 37A is further transported downwardly to pass through the vacant spaces 335A and achieves the effective gas transportation. Finally, as shown in FIG. 4D, when the suspension plate 331A return to an initial position, the resonance plate 32A is keep on displacing downwardly due to inertia. In that, the resonance plate 32A pushes the gas in the chamber space 37A toward the vacant spaces 335A, and the volume of the convergence chamber 313A is increased. Thus, the gas can continuously pass through the inlet apertures 311A and the convergence channels 312A, and converge into the convergence chamber 313A. By repeating the operation steps illustrated in FIGS. 4B to 4D continuously, the gas enters the inlet apertures 311A continuously, flows through a flow path formed by the inlet plate 31A and the resonance plate 32A and generates a pressure gradient, and then is transported downwardly through the vacant spaces 335A to transport the gas at high speed, and the gas transporting operation of the micro pump 3A is completed.

Figure 5A:
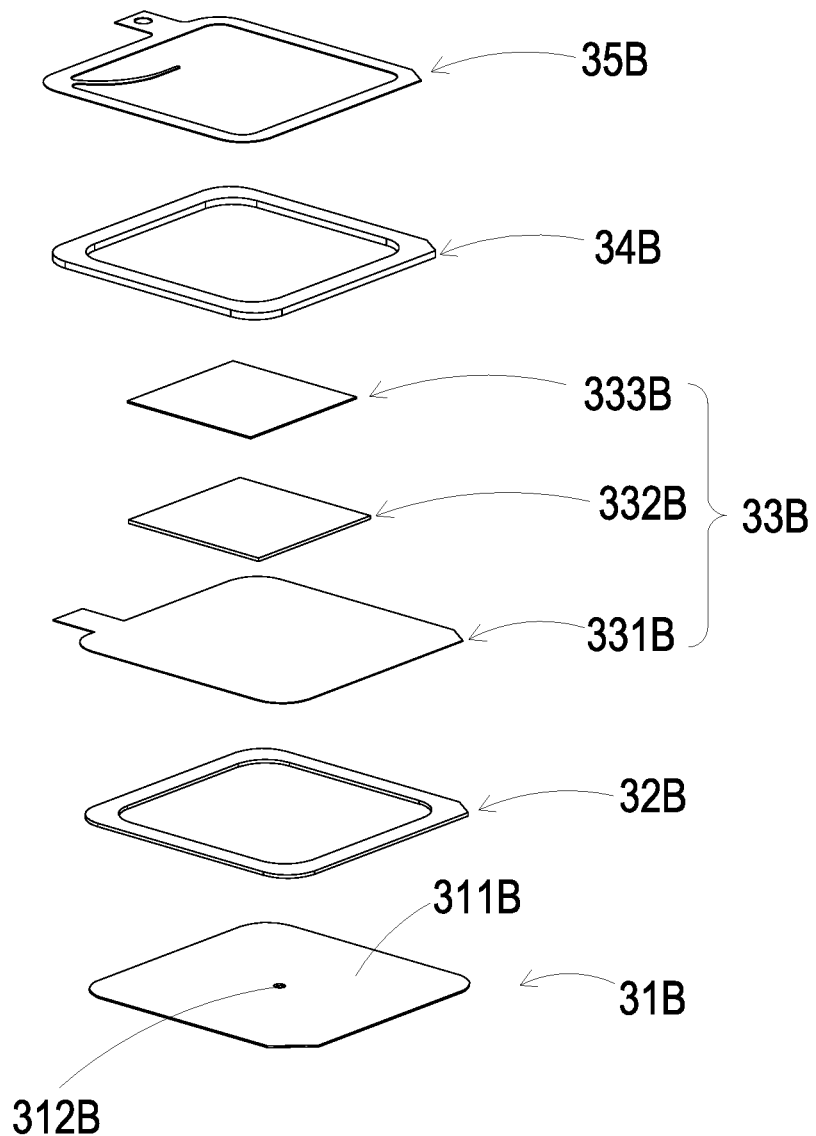
FIG. 5A is a schematic exploded view illustrating the blower-type micro pump of the particle detecting device of the present disclosure and taken along front viewpoint.
Figure 5B:
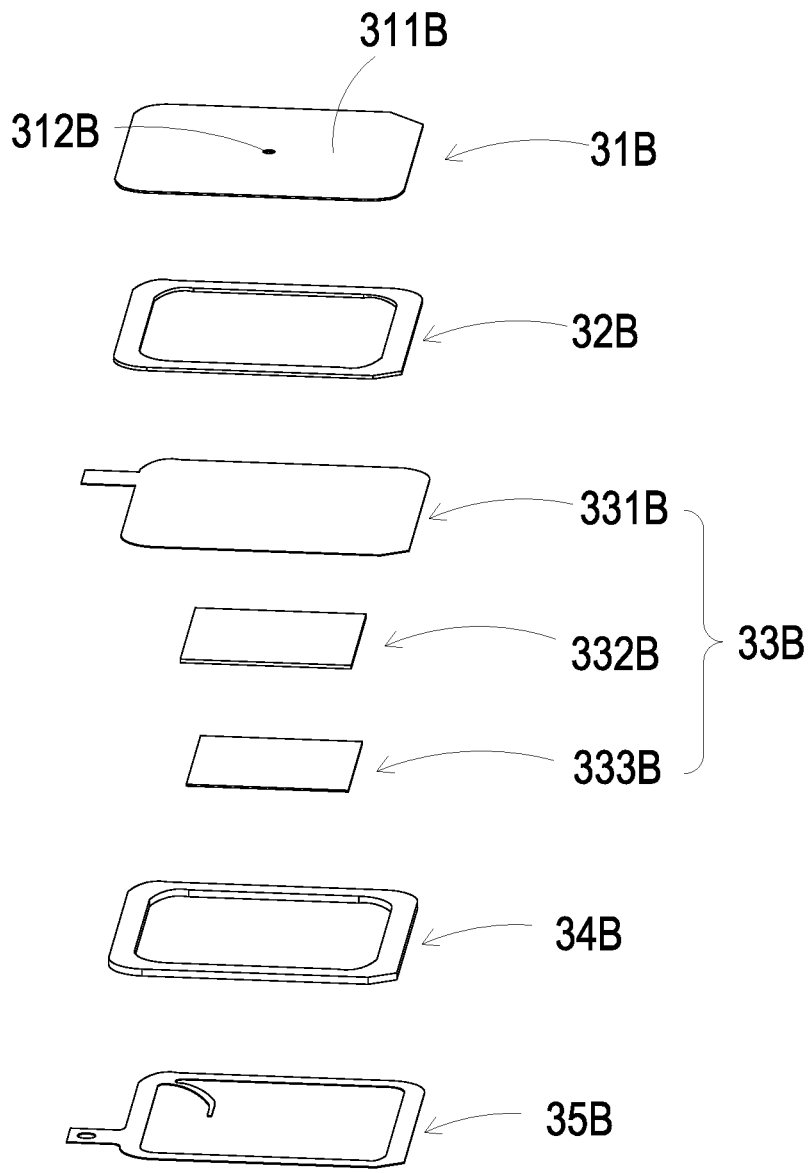
FIG. 5B is a schematic exploded view illustrating the blower-type micro pump of the particle detecting device of the present disclosure and taken along rear viewpoint.

Please refer to FIGS. 5A and 5B. In the embodiment, the blower-type micro pump 3B includes a gas-injection plate 31B, a chamber frame 32B, an actuator element 33B, an insulation frame 34B and a conductive frame 35B. In the embodiment, the gas-injection plate 31B is made by a flexible material and includes a suspension plate 311B and a hollow aperture 312B. The suspension plate 311B is permitted to undergo a bending deformation, but not limited thereto. The hollow aperture 312B passes through a center of the suspension plate 311B, so as to allow the gas to flow therethrough. In the embodiment, the chamber frame 32B is carried and stacked on the gas-injection plate 31B. The actuator element 33B is carried and stacked on the chamber frame 32B, and includes a piezoelectric carrying plate 331B, an adjusting resonance plate 332B and a piezoelectric plate 333B. The piezoelectric carrying plate 331B is carried and stacked on the chamber frame 32B. The adjusting resonance plate 332B is carried and stacked on the piezoelectric carrying plate 331B. The piezoelectric plate 333B is carried and stacked on the adjusting resonance plate 332B, so that when a voltage is applied to the piezoelectric plate 333B, the piezoelectric carrying plate 331B and the adjusting resonance plate 332B are driven to generate the bending deformation in the reciprocating manner. In the embodiment, the adjusting resonance plate 332B is located between the piezoelectric plate 333B and the piezoelectric carrying plate 331B and served as a cushion between the piezoelectric plate 333B and the piezoelectric carrying plate 331B. Thereby, the vibration frequency of the piezoelectric carrying plate 331B is adjustable. Basically, the thickness of the adjusting resonance plate 332B is greater than the thickness of the piezoelectric carrying plate 331B, and the thickness of the adjusting resonance plate 332B is adjustable, thereby adjusting the vibration frequency of the actuator element 33B. In the embodiment, the insulation frame 34B is carried and stacked on the actuator element 33B. The conductive frame 35B is carried and stacked on the insulation frame 34B. A resonance chamber 36B is collaboratively defined by the actuator element 33B, the chamber frame 32B and the suspension plate 331B. In that, the gas-injection plate 31B, the chamber frame 32B, the actuator element 33B, the insulation frame 34B and the conductive frame 35B are stacked sequentially. In the embodiment, the gas-injection plate 31B is fixed in a gas-guiding-component carrying seat 37B, and the blower-type micro pump 3B is carried and positioned in the gas-guiding-component carrying seat 37B for supporting and positioning, so that a vacant space 38B is defined between of the suspension plate 311B of the gas-injection plate 31B in the blower-type micro pump 3B and an inner edge of the gas-guiding-component carrying seat 37B for gas to flow therethrough. Moreover, a flowing chamber 39B is formed between the gas-injection plate 31B and the bottom surface of the gas-guiding-component carrying seat 37B. The flowing chamber 39B is in fluid communication with the resonance chamber 36B located between the actuator element 33B, the chamber frame 32B and the suspension plate 311B through the hollow aperture 312B of the gas-injection plate 31B. Through controlling the vibration frequency of the gas in the resonance chamber 36B and making it close to the vibration frequency of the suspension plate 311B, the Helmholtz resonance effect is introduced between the resonance chamber 36B and the suspension plate 311B, thereby improves the efficiency of gas transportation.

Figure 6A:
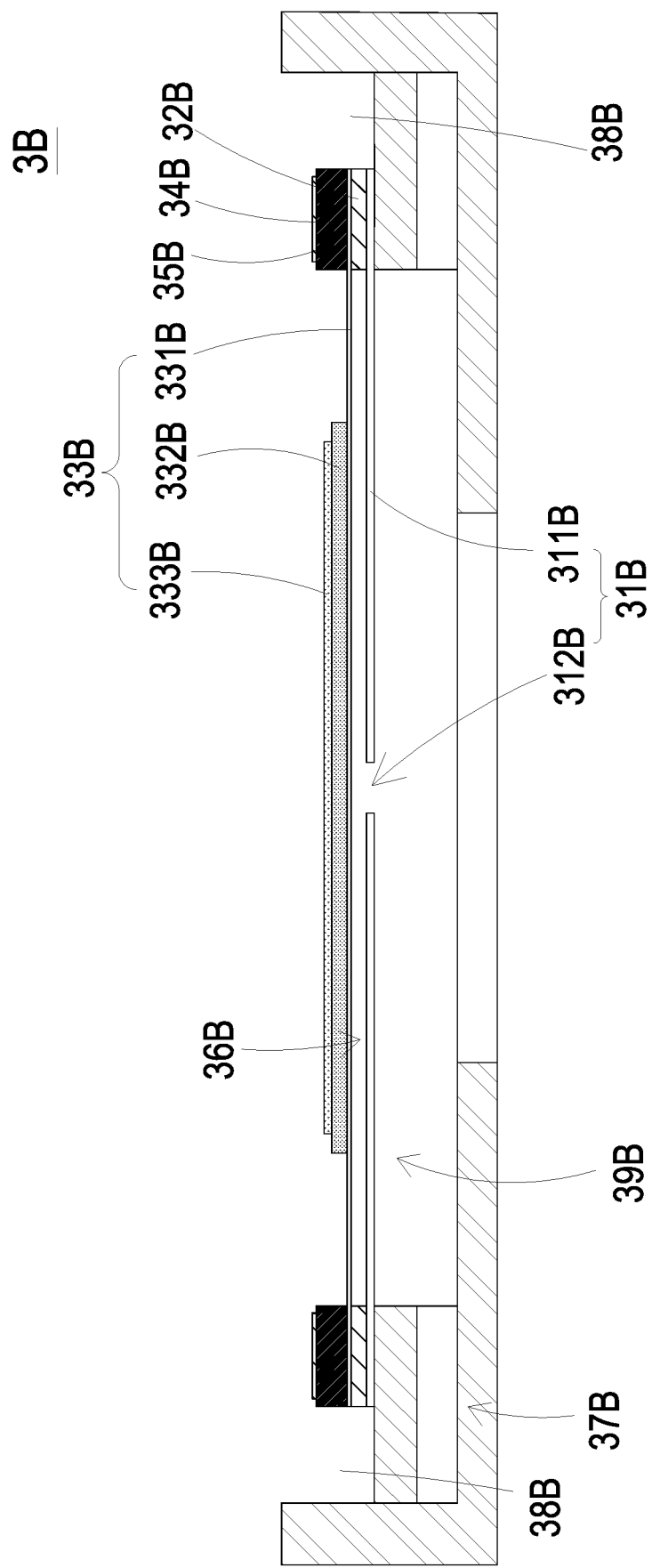
FIG. 6A is a schematic cross-sectional view illustrating the blower-type micro pump of the particle detecting device of the present disclosure.
Figure 6B:
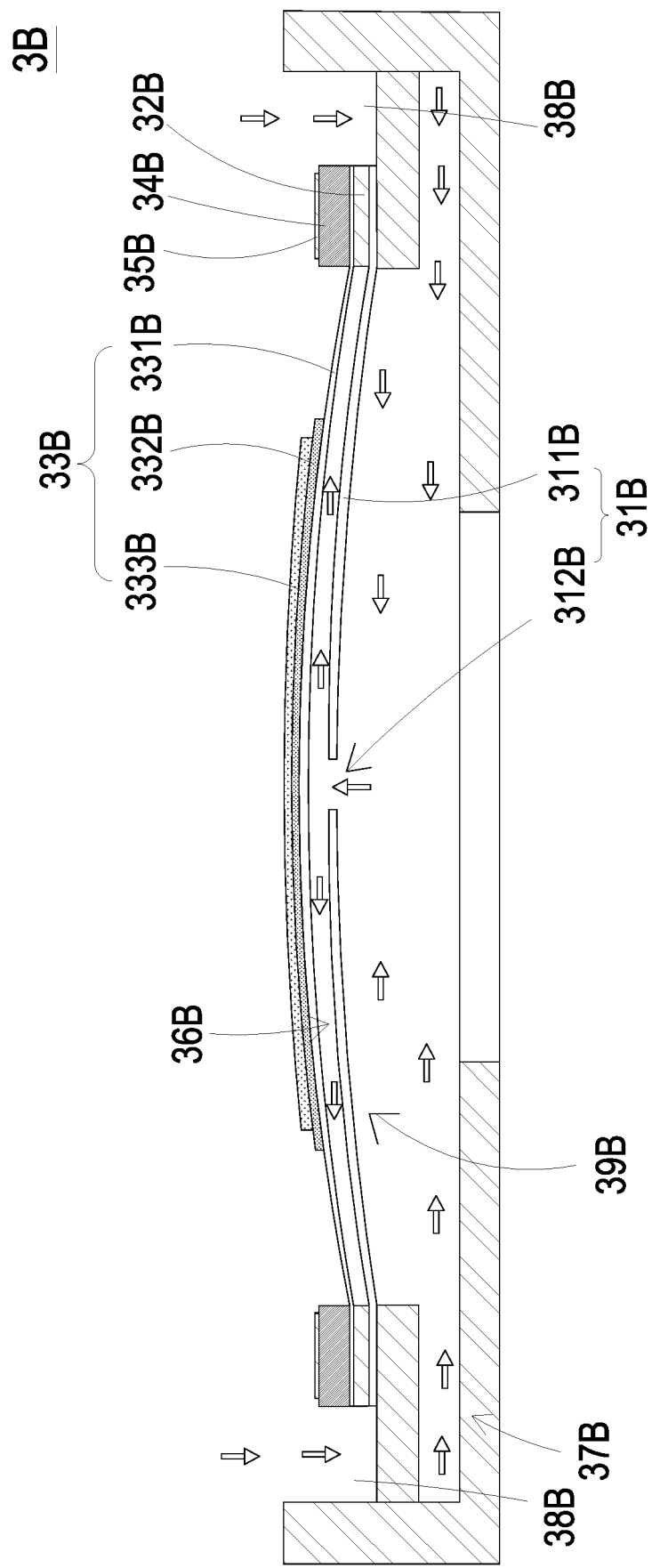
FIGS. 6B to 6C schematically illustrate the operation steps of the blower-type micro pump of FIG. 6A.
Figure 6C:
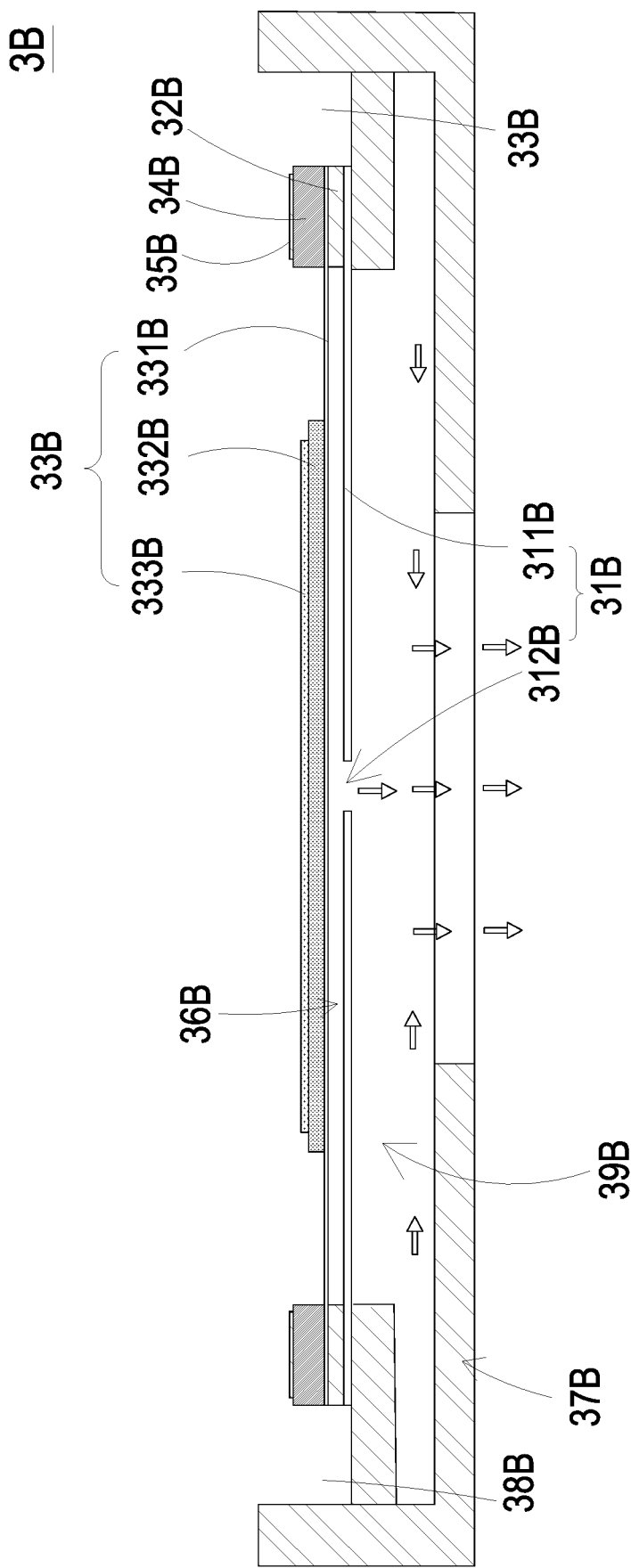

In order to understand the operation steps of the above-mentioned blower-type micro pump 3B for gas transportation, please refer to FIG. 6B. When the piezoelectric plate 333B is moved away from the bottom surface of the gas-guiding-component carrying seat 37B, the suspension plate 311B of the gas-injection plate 31B is driven to move away from the bottom surface of the gas-guiding-component carrying seat 37B by the piezoelectric plate 333B, and the volume of the flowing chamber 39B is expanded rapidly, the internal pressure of the flowing chamber 39B is decreased to generate a negative pressure, and the gas outside the blower-type micro pump 3B is inhaled through the vacant space 38B and enters the resonance chamber 36B through the hollow aperture 312B. Consequently, the pressure in the resonance chamber 36B is increased to generate a pressure gradient. Further as shown in FIG. 6C, when the suspension plate 311B of the gas-injection plate 31B is driven by the piezoelectric plate 333B to move toward the bottom surface of the gas-guiding-component carrying seat 37B, the gas in the resonance chamber 36B is discharged out rapidly through the hollow aperture 312B, and the gas in the flowing chamber 39B is compressed. In that, the converged gas is quickly and massively ejected out of the gas-guiding-component carrying seat 37B in a gas state close to an ideal gas state of the Benulli's law. By repeating the above operation steps shown in FIG. 6B and FIG. 6C, the piezoelectric plate 333B is driven to generate the bending deformation in a reciprocating manner According to the principle of inertia, the gas pressure inside the resonance chamber 36B after exhausting is lower than the equilibrium gas pressure outside, and the gas is introduced into the resonance chamber 36B again. Moreover, the vibration frequency of the gas in the resonance chamber 36B is controlled to be close to the vibration frequency of the piezoelectric plate 333B, so as to generate the Helmholtz resonance effect and to achieve the gas transportation at high speed and in large quantities.

Figure 7A:
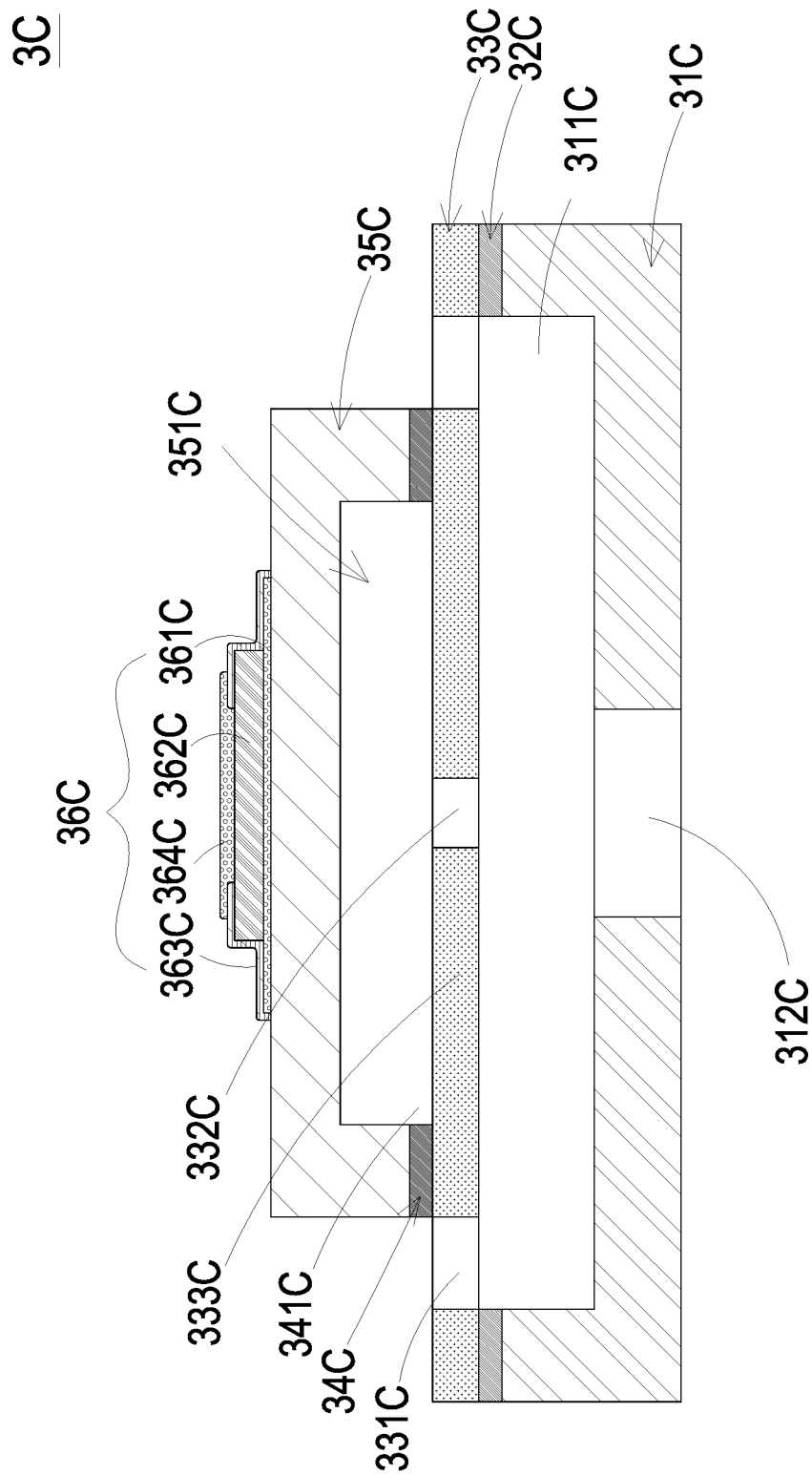
FIG. 7A is a schematic cross-sectional view illustrating the blower-type microelectromechanical-system micro pump of the particle detecting device of the present disclosure.
Figure 7B:
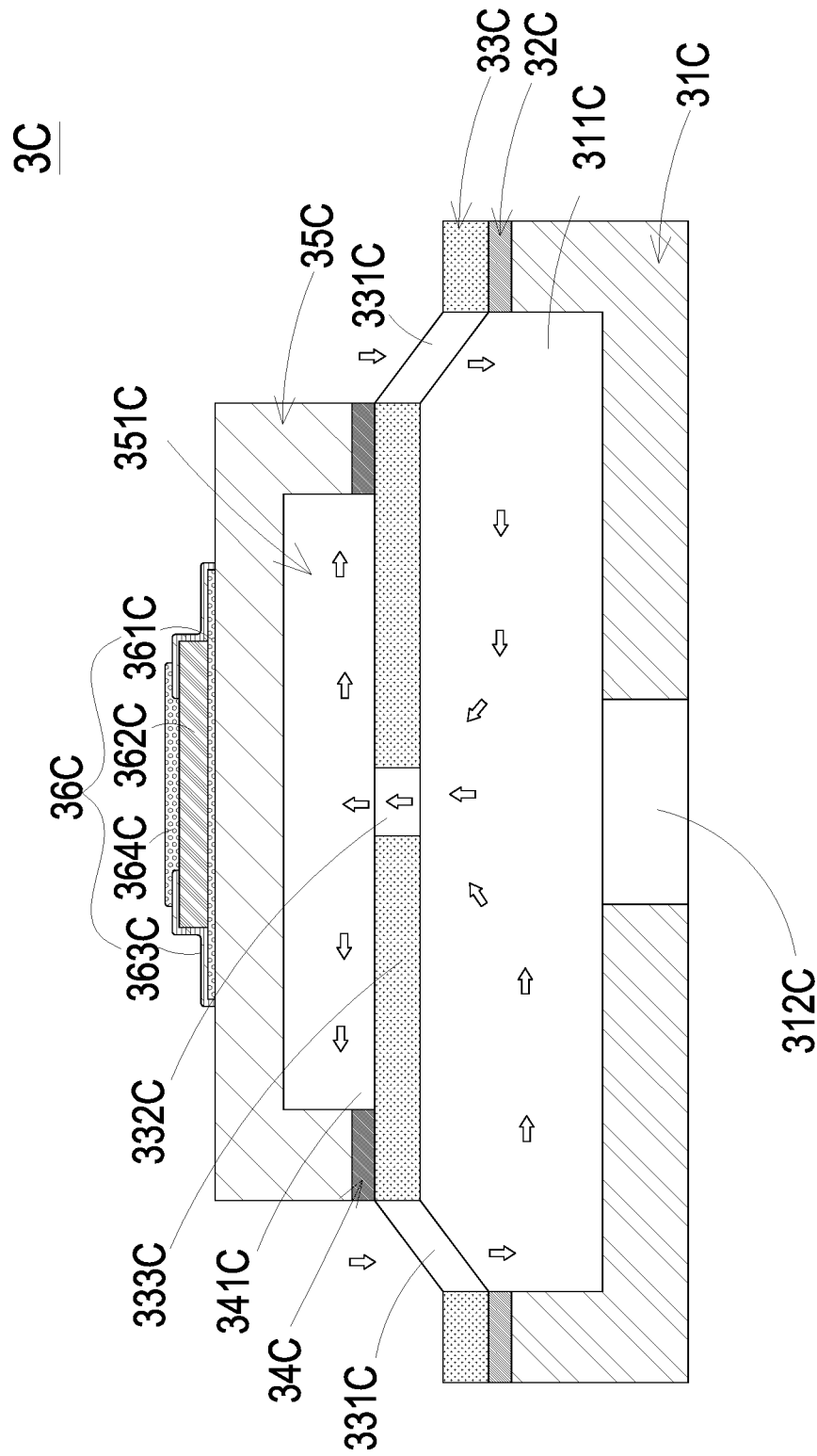
FIGS. 7B to 7C schematically illustrate the operation steps of the blower-type microelectromechanical-system micro pump of FIG. 7A.
Figure 7C:
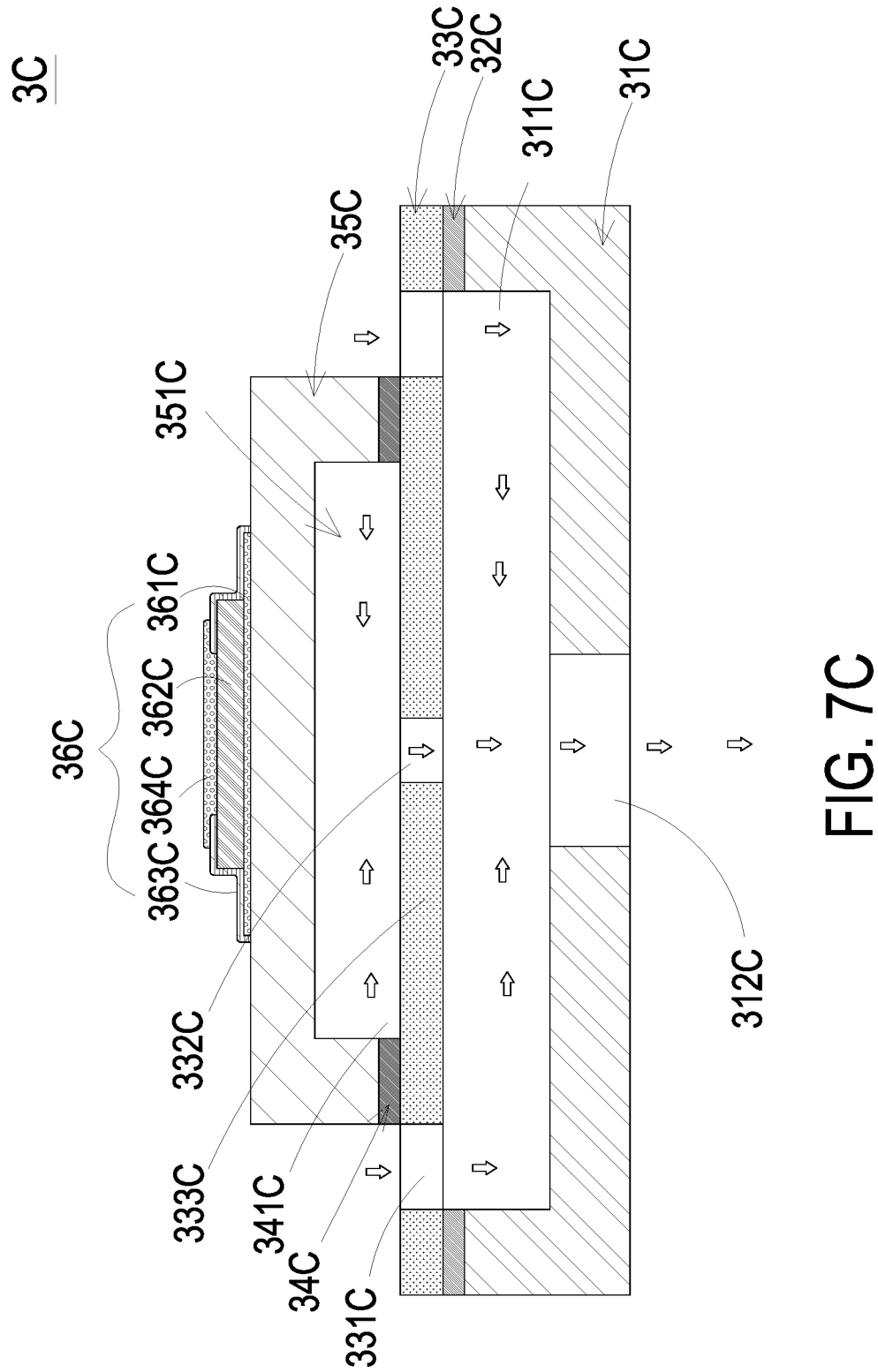

Please refer to FIG. 7A, FIG. 7B and FIG. 7C. In the embodiment, the microelectromechanical-system micro pump 3C includes an outlet base 31C, a first oxidation layer 32C, a gas-jetting resonance layer 33C, a second oxidation layer 34C, a resonance-chamber layer 35C and a first piezoelectric component 36C, which are all manufactured by semiconductor process. In the embodiment, the semiconductor process includes at least one etching process and at least one deposition process. The etching process is selected from the group consisting of a wet etching process, a dry etching process and a combination thereof, but not limited thereto. The deposition process is selected from the group consisting of a physical vapor deposition process (PVD), a chemical vapor deposition process (CVD) and a combination thereof, and not redundantly described hereafter.

In the embodiment, the outlet base 31C includes a compression chamber 311C and a through hole 312C manufactured by a silicon-substrate etching process. In the embodiment, the first oxidation layer 32C is formed and stacked on the outlet base 31C by a deposition process, and a part corresponding to the compression chamber 311C is etched to remove. In the embodiment, the gas-jetting resonance layer 33C is formed and stacked on the first oxidation layer 32C by a silicon-substrate deposition process. A plurality of inlet apertures 331C are formed by etching and removing a part of the gas-jetting resonance layer 33C corresponding to the compression chamber 311C, and a gas jetting hole 332C is formed by etching and removing a part of the gas-jetting resonance layer 33C corresponding to a center of the compression chamber 311C, so that a suspension section 333C capable of displacing and vibrating is formed between the inlet apertures 331C and the gas-jetting hole 332C. In the embodiment, the second oxidation layer 34C is formed and stacked on the suspension section 333C of the gas jetting resonance layer 33C by a deposition process. A resonance-chamber section 341C is formed by partially etching and is in fluid communication with the gas-jetting hole 332C. In the embodiment, the resonance-chamber layer 35C includes a resonance chamber 351C formed by a silicon-substrate etching process, and is correspondingly connected and stacked on the second oxidation layer 34C, so that the resonance chamber 351C is corresponding to the resonance-chamber section 341C of the second oxidation 34C. In the embodiment, the first piezoelectric component 36C is formed and stacked on the resonance-chamber layer 35C, and includes a first lower electrode layer 361C, a first piezoelectric layer 362C, a first insulation layer 363C and a first upper electrode layer 364C. The first lower electrode layer 361C is formed and stacked on the resonance-chamber layer 35C by a deposition process. The first piezoelectric layer 362C is formed and stacked on a partial surface of the first lower electrode layer 361C by a deposition process. The first insulation layer 363C is formed and stacked on a partial surface of the first piezoelectric layer 362C by a deposition process. The first upper electrode layer 364C is formed and stacked on the first insulation layer 363C and a remaining surface of the first piezoelectric layer 362C without the first insulation layer 363C disposed thereon by a deposition process, so as to electrically connect with the first piezoelectric layer 362C.

In order to understand the operation steps of the above-mentioned blower-type micro pump 3C for gas transportation, please refer to FIGS. 7B to 7C. When the first piezoelectric component 36C is driven to drive the gas jetting resonance layer 33C and generate a resonance, such that the suspension section 333C of the gas-jetting resonance layer 33C is vibrated and displaced reciprocatingly, whereby a gas is inhaled into the compression chamber 311C through the plurality of inlet apertures 331C, flows through the gas jetting hole 332C and is transported into the resonance chamber 351C. Through controlling the vibration frequency of the gas in the resonance chamber 351C and making it close to the vibration frequency of the suspension section 333C, the Helmholtz resonance effect is introduced between the resonance chamber 351C and the suspension section 333, whereby the gas collected in the resonance chamber 351C is discharged out and transported to the compression chamber 311C, flows through the through hole 312C, and then is discharged out with high pressure, so as to achieve gas transportation under high pressure and improve gas transportation efficiency.

Figure 8A:
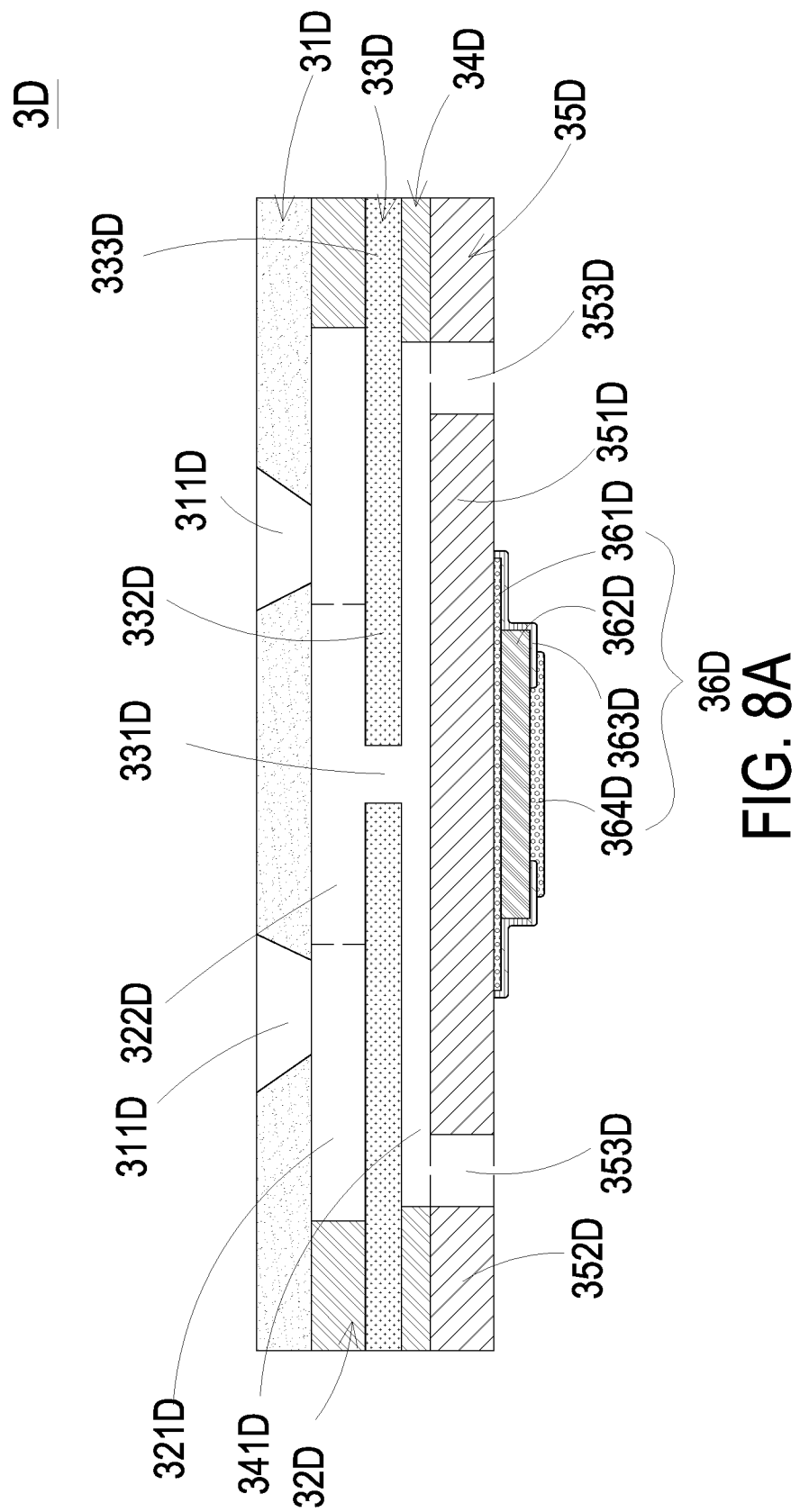
FIG. 8A is a schematic cross-sectional view illustrating the microelectromechanical-system pump of particle detecting device of the present disclosure.
Figure 8B:
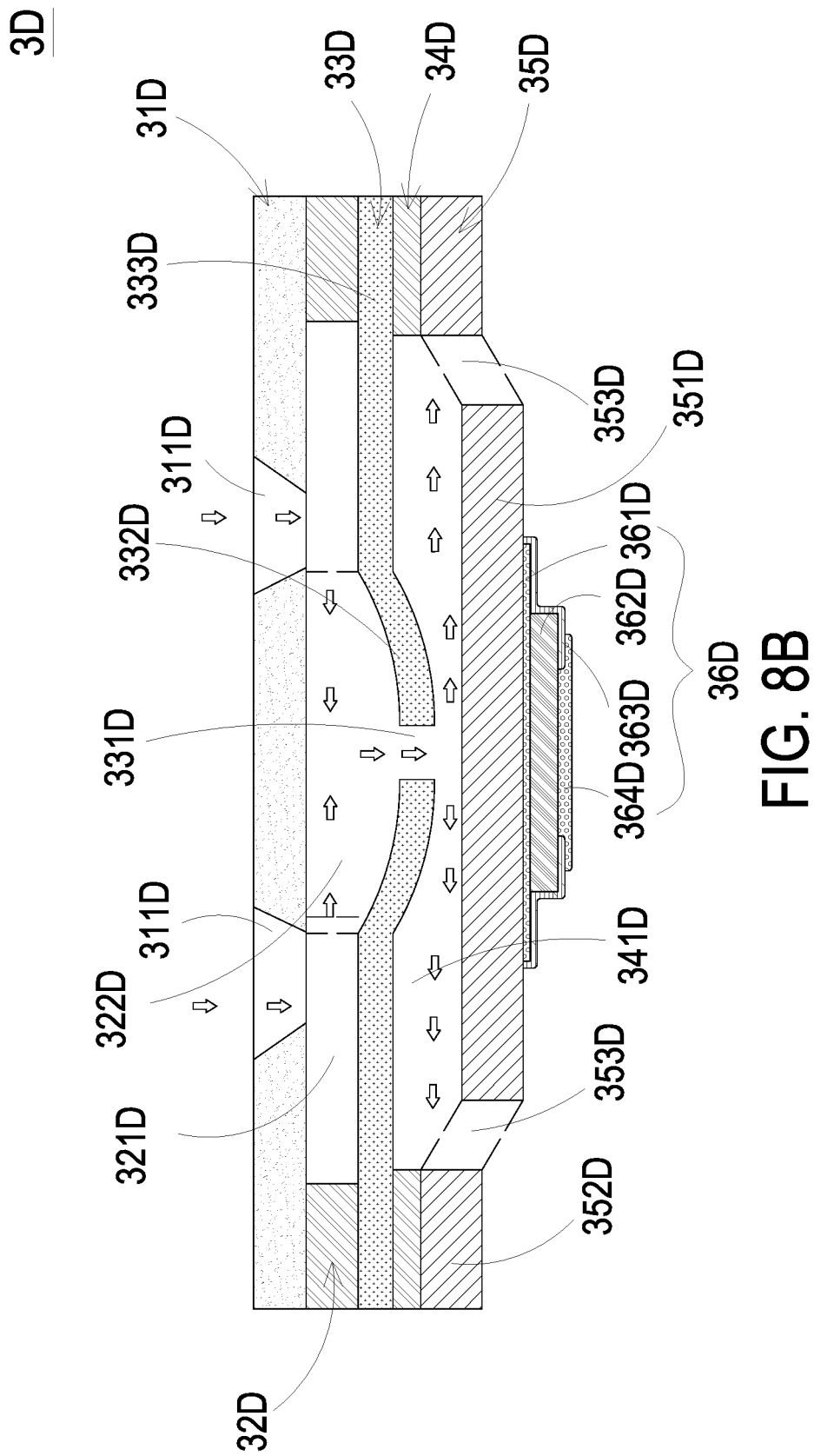
FIGS. 8B to 8C schematically illustrate the operation steps of the microelectromechanical-system pump of FIG. 8A
Figure 8C:
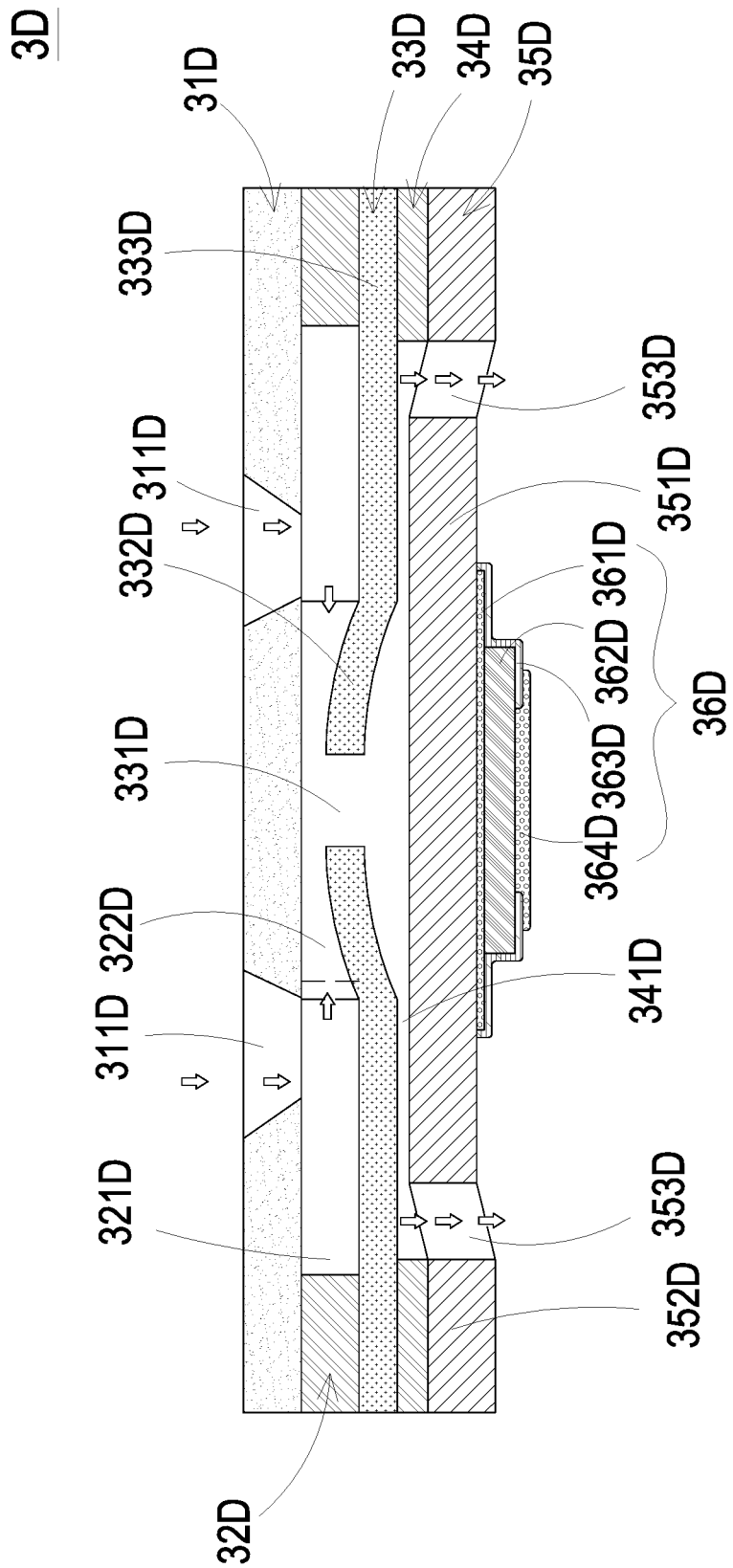

Please refer to FIG. 8A, FIG. 8B and FIG. 8C. In the embodiment, the microelectromechanical-system pump 3D includes an inlet base 31D, a third oxidation layer 32D, a resonance layer 33D, a fourth oxidation layer 34D, a vibration layer 35D and a second piezoelectric component 36D, which are all manufactured by semiconductor process. In the embodiment, the semiconductor process includes at least one etching process and at least one deposition process. The etching process is selected from the group consisting of a wet etching process, a dry etching process and a combination thereof, but not limited thereto. The deposition process is selected from the group consisting of a physical vapor deposition process (PVD), a chemical vapor deposition process (CVD) and a combination thereof, and not redundantly described hereafter.

In the embodiment, the inlet base 31D includes at least one inlet aperture 311D formed by a silicon-substrate etching process. In the embodiment, the third oxidation layer 32D is formed and stacked on the inlet base 31D by a deposition process. The third oxidation layer 32D includes a plurality of convergence channels 321D and a convergence chamber 322D formed by an etching process. The plurality of convergence channels 321D are in fluid communication between the convergence chamber 322D and the at least one inlet aperture 311D of the inlet base 31D. The resonance layer 33D is formed and stacked on the third oxidation layer 32D by a silicon-substrate deposition process, and includes a central through hole 331D, a vibration section 332D and a fixed section 333D formed by an etching process. The central through hole 331D is formed at a center of the resonance layer 33D. The vibration section 332D is disposed around a peripheral region of the central through hole 331D, and the fixed section 333D is disposed around a peripheral region of the resonance layer 33D. The fourth oxidation layer 34D is formed and stacked on the resonance layer 33D by a deposition process, and includes a compression-chamber section 341D formed by partially etching to remove a part of the fourth oxidation layer 34D. In the embodiment, the vibration layer 35D is formed and stacked on the fourth oxidation layer 34D by a silicon-substrate deposition process and includes an actuating section 351D, an outer peripheral section 352D and a plurality of gas apertures 353D formed by an etching process. The actuating section 351D is disposed at a central part of the vibration layer 35D. The outer peripheral section 352D is disposed around an outer periphery of the actuating section 351D, and the plurality of gas apertures 353D are formed between the actuating section 351D and the outer peripheral section 352D, respectively. A compression chamber is collaboratively defined by the vibration layer 35D and the compression-chamber section 341D of the fourth oxidation layer 34D. The second piezoelectric component 36D is formed and stacked on the actuating section 351D of the vibration layer 35D by a deposition process and includes a second lower electrode layer 361D, a second piezoelectric layer 362D, a second insulation layer 363D and a second upper electrode layer 364D. The second layer electrode layer 361D is formed and stacked on the actuating section 351D of the vibration layer 35D by a deposition process. The second piezoelectric layer 362D is formed and stacked on a partial surface of the second lower electrode layer 361D by a deposition process. The second insulation layer 363D is formed and stacked on a partial surface of the second piezoelectric layer 362D by a deposition process. The second upper electrode layer 364D is formed and stacked on the second insulation layer 363D and a remaining surface of the second piezoelectric layer 362D without the second insulation layer 363D disposed thereon by a deposition process, so as to electrically connect with the second piezoelectric layer 362.

In order to understand the operation steps of the above-mentioned microelectromechanical-system pump 3D for gas transportation, please refer to FIGS. 8B to 8C. When the first piezoelectric component 36D is driven to drive the resonance layer 33D and the vibration layer 35D to displace and generate a resonance effect, the gas introduced from the at least one inlet aperture 311D is converged to the convergence chamber 322D through the plurality of convergence channels 321D, flows through the central through hole 331D of the resonance layer 33, and then is discharged out through the plurality of gas apertures 353D of the vibration layer 35D, so as to achieve gas transportation at high flow.

In summary, the present disclosure provides a portable miniature particle detecting device formed by an impactor, a resonator and a piezoelectric actuator. The piezoelectric actuator is used to transport a gas into the impactor to allow the gas outside the particle detecting device to be inhaled into the impactor and collected screened and required-diameter particles, thereby the resonator is able to detect a mass and a concentration of the screened and required-diameter particles. Thus, the air quality can be monitored immediately anytime and anywhere, and people are allowed to understand the gas quality of the inhaled gas.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A particle detecting device, comprising:
an impactor comprising a box and an impacting plate, wherein the box comprises a screening chamber, an air inlet and a discharging through hole, the screening chamber is disposed within the box and in fluid communication with the air inlet and the discharging through hole, and the impacting plate is disposed within the screening chamber, corresponding to the air inlet, and maintains a spacing distance, wherein a gas containing a plurality of suspended particles inhaled through the air inlet is impacted for performing separation and screening based on different diameters of the suspended particles, so that screened and required-diameter particles are led out and collected through the discharging through hole;
a resonator disposed under, sealed and connected to the impactor, and comprising a sampling chamber, a driving board, a piezoelectric vibrator and a suspended-particle sensor, wherein the sampling chamber is in fluid communication with the discharging through hole of the impactor, the driving board is disposed within the sampling chamber and comprises at least one passage hole disposed thereon, and the piezoelectric vibrator is packaged on the driving board, wherein the suspended-particle sensor is packaged on the piezoelectric vibrator, and the suspended-particle sensor is corresponding to the discharging through hole and maintains a spacing distance, wherein driving power and operation frequency of the piezoelectric vibrator are provided by the driving board, and a resonance frequency of the piezoelectric vibrator is changed, thereby the screened and required-diameter particles are sedimented and collected on a surface of the suspended-particle sensor, so that a mass and a concentration of the screened and required-diameter particles are detected; and
a piezoelectric actuator disposed under, sealed and connected to the resonator, and driven to enable gas transportation, so that the gas is inhaled through the air inlet from an outside of the particle detecting device, flows into the resonator to be collected by the suspended-particle sensor, and discharged out of the particle detecting device through the at least one passage hole.

2. The particle detecting device according to claim 1, wherein the piezoelectric actuator is a micro pump, and the micro pump comprises:
   an inlet plate comprising at least one inlet aperture, at least one convergence channel and a convergence chamber, wherein the at least one inlet aperture is disposed to inhale the gas, and the at least one convergence channel is disposed corresponding in position to the inlet aperture to guide the gas inhaled from the inlet aperture to the convergence chamber;
   a resonance plate combined on the inlet plate and having a central aperture, a movable part and a fixed part, wherein the central aperture is disposed at a center of the resonance plate, and is corresponding in position to the convergence chamber of the inlet plate, the movable part is disposed around the central aperture and is corresponding in position to the convergence chamber, and the fixed part is disposed around the movable part and is fixedly attached on the inlet plate; and
   a piezoelectric actuator combined on the resonance plate, corresponding in position to the resonance plate, and comprising a suspension plate, an outer frame, at least one bracket and a piezoelectric element, wherein the suspension plate is square-shaped and permitted to undergo a bending deformation, the outer frame is disposed around a periphery of the suspension plate, the at least one bracket is connected between the suspension plate and the outer frame for elastically supporting the suspension plate, and the piezoelectric element is attached to a surface of the suspension plate for driving the suspension plate to undergo the bending deformation when a voltage is applied;
   wherein a chamber space is formed between the resonance plate and the piezoelectric actuator, wherein when the piezoelectric actuator is driven, the gas introduced from the at least one inlet aperture of the inlet plate is converged to the convergence chamber through the at least one convergence channel, and flows through the central aperture of the resonance plate, whereby the piezoelectric actuator and the movable part of the resonance plate generates a resonance effect to transport the gas.

3. The particle detecting device according to claim 2, wherein the micro pump further comprises a first insulation plate, a conductive plate and a second insulation plate, wherein the inlet plate, the resonance plate, the piezoelectric actuator, the first insulation plate, the conductive plate and the second insulation plate are stacked sequentially.

4. The particle detecting device according to claim 1, wherein the piezoelectric actuator is a blower-type micro pump, the blower-type micro pump is fixed in a gas-guiding-component carrying seat, and the blower-type micro pump comprises:
   a gas-injection plate fixed in the gas-guiding-component carrying seat and comprising a suspension plate and a hollow aperture, wherein the suspension plate is permitted to undergo a bending deformation, and the hollow aperture is formed at a center of the suspension plate;
   a chamber frame carried and stacked on the suspension plate;
   an actuator element carried and stacked on the chamber frame, and comprising a piezoelectric carrying plate, an adjusting resonance plate and a piezoelectric plate, wherein the piezoelectric carrying plate is carried and stacked on the chamber frame, the adjusting resonance plate is carried and stacked on the piezoelectric carrying plate, and the piezoelectric plate is carried and stacked on the adjusting resonance plate, wherein the piezoelectric plate is configured to drive the piezoelectric carrying plate and the adjusting resonance plate to generate the bending deformation in the reciprocating manner by the applied voltage;
   an insulation frame carried and stacked on the actuator element; and
   a conductive frame carried and stacked on the insulation frame;
   wherein the gas-injection plate is fixed in the gas-guiding-component carrying seat for supporting and positioning, so that a vacant space is defined between the gas-injection plate and an inner edge of the gas-guiding-component carrying seat for gas flowing therethrough, a flowing chamber is defined between the gas-injection plate and a bottom of the gas-guiding-component carrying seat, and a resonance chamber is formed between the actuator element, the chamber frame and the suspension plate, wherein when the actuator element is enabled to drive the gas-injection plate to move and generate a resonance effect, the suspension plate of the gas-injection plate is driven to generate the bending deformation in a reciprocating manner, the gas is inhaled through the vacant space, flows into the flowing chamber, and is discharged out, so as to achieve gas transportation.

5. The particle detecting device according to claim 1, wherein the piezoelectric actuator is a blower-type microelectromechanical-system micro pump and the blower-type microelectromechanical-system micro pump comprises:
   an outlet base comprising a compression chamber and a through hole formed by a silicon-substrate etching process;
   a first oxidation layer formed and stacked on the outlet base by a deposition process, wherein a part of the first oxidation layer corresponding to the compression chamber is etched to remove;
   a gas jetting resonance layer formed and stacked on the first oxidation layer by a silicon-substrate deposition process, wherein a plurality of inlet apertures are formed by etching and removing a part of the gas-jetting resonance layer corresponding to the compression chamber, and a gas-jetting hole is formed by etching and removing a part of the gas jetting resonance layer corresponding to a center of the compression chamber, so that a suspension section capable of displacing and vibrating is formed between the inlet apertures and the gas-jetting hole;
   a second oxidation layer formed and stacked on the suspension section of the gas-jetting resonance layer by a deposition process, wherein a resonance-chamber section is formed by partially etching and is in fluid communication with the gas-jetting hole;
   a resonance-chamber layer comprising a resonance chamber formed by a silicon-substrate etching process, and correspondingly connected and stacked on the second oxidation layer, so that the resonance chamber is corresponding to the resonance-chamber section of the second oxidation; and
   a first piezoelectric component formed and stacked on the resonance-chamber layer, and comprising a first lower electrode layer, a first piezoelectric layer, a first insulation layer and a first upper electrode layer, wherein the first lower electrode layer is formed and stacked on the resonance-chamber layer by a deposition process, the first piezoelectric layer is formed and stacked on a partial surface of the first lower electrode layer by a deposition process, the first insulation layer is formed and stacked on a partial surface of the first piezoelectric layer by a deposition process, and the first upper electrode layer is formed and stacked on the first insulation layer and a remaining surface of the first piezoelectric layer without the first insulation layer disposed thereon by a deposition process, so as to electrically connect with the first piezoelectric layer;

wherein when the first piezoelectric component is driven to drive the gas-jetting resonance layer and generate a resonance effect, the suspension section of the gas-jetting resonance layer is vibrated and replaced in reciprocating means, whereby the gas is inhaled into the compression chamber through the plurality of inlet apertures, flows through the gas-jetting hole and is transported into the resonance chamber, wherein the gas collected in the resonance chamber is discharged out and transported to the compression chamber, flows through the through hole, and then is discharged out from the outlet chamber with high pressure, so as to achieve gas transportation.

6. The particle detecting device according to claim 1, wherein the piezoelectric actuator is a microelectromechanical-system micro pump and the microelectromechanical-system micro pump comprises:

an inlet base comprising at least one inlet aperture formed by a silicon-substrate etching process;

a third oxidation layer formed and stacked on the inlet base by a deposition process, wherein the third oxidation layer comprises a plurality of convergence channels and a convergence chamber formed by an etching process, and the plurality of convergence channels are in fluid communication between the convergence chamber and the at least one inlet aperture of the inlet base;

a resonance layer formed and stacked on the third oxidation layer by a silicon-substrate deposition process, and comprising a central through hole, a vibration section and a fixed section formed by an etching process, wherein the central through hole is formed at a center of the resonance layer, the vibration section is disposed around a peripheral region of the central through hole, and the fixed section is disposed around a peripheral region of the resonance layer;

a fourth oxidation layer formed and stacked on the resonance layer by a deposition process, and comprising a compression-chamber section formed by partially etching to remove a part of the fourth oxidation layer;

a vibration layer formed and stacked on the fourth oxidation layer by a silicon-substrate deposition process and comprising an actuating section, an outer peripheral section and a plurality of gas apertures formed by an etching process, wherein the actuating section is disposed at a central part of the vibration layer, the outer peripheral section is disposed around an outer periphery of the actuating section, and the plurality of gas apertures are formed between the actuating section and the outer peripheral section, respectively, wherein a compression chamber is collaboratively defined by the vibration layer and the compression-chamber section of the fourth oxidation layer; and a second piezoelectric component formed and stacked on the actuating section of the vibration layer by a deposition process and comprising a second lower electrode layer, a second piezoelectric layer, a second insulation layer and a second upper electrode layer, wherein the second layer electrode layer is formed and stacked on the actuating section of the vibration layer by a deposition process, the second piezoelectric layer is formed and stacked on a partial surface of the second lower electrode layer by a deposition process, the second insulation layer is formed and stacked on a partial surface of the second piezoelectric layer by a deposition process, and the second upper electrode layer is formed and stacked on the second insulation layer and a remaining surface of the second piezoelectric layer without the second insulation layer disposed thereon by a deposition process, so as to electrically connect with the second piezoelectric layer;

wherein when the second piezoelectric component is driven to drive the vibration layer and the resonance layer and generate a resonance displacement, the gas introduced from the at least one inlet aperture is converged to the convergence chamber through the plurality of convergence channels, flows through the central through hole of the resonance layer, and then is discharged out through the plurality of gas apertures of the vibration layer, so as to achieve gas transportation.

7. The particle detecting device according to claim 1, wherein the piezoelectric vibrator is a quartz chip.

8. The particle detecting device according to claim 1, wherein the suspended-particle sensor detects the mass and the concentration of the screened and required-diameter particles contained in the gas selected form the group consisting of PM10, PM2.5, PM1 and a combination thereof.

* * * * *